(12) United States Patent
Nishi

(10) Patent No.: US 7,693,092 B2
(45) Date of Patent: Apr. 6, 2010

(54) MULTICAST TREE MONITORING METHOD AND SYSTEM IN IP NETWORK

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 11/854,122

(22) Filed: Sep. 12, 2007

(65) Prior Publication Data
US 2008/0175172 A1    Jul. 24, 2008

Related U.S. Application Data

(63) Continuation of application No. PCT/JP2005/004697, filed on Mar. 16, 2005.

(51) Int. Cl.
*H04L 12/28* (2006.01)
(52) U.S. Cl. ............... 370/256; 370/390; 370/225; 370/337; 370/338; 709/231; 709/213; 709/249
(58) Field of Classification Search .......... 370/225, 370/256, 337, 338, 244, 347, 390, 442; 709/231, 709/213, 249, 204, 223, 229, 246, 252
See application file for complete search history.

(56) References Cited

U.S. PATENT DOCUMENTS

| | | | | |
|---|---|---|---|---|
| 2002/0041586 | A1* | 4/2002 | Hayashino et al. | 370/338 |
| 2002/0181485 | A1* | 12/2002 | Cao et al. | 370/419 |
| 2003/0065944 | A1* | 4/2003 | Mao et al. | 713/201 |
| 2003/0090996 | A1* | 5/2003 | Stewart | 370/225 |
| 2004/0034800 | A1* | 2/2004 | Singhal et al. | 713/201 |
| 2005/0240797 | A1* | 10/2005 | Orava et al. | 714/4 |

FOREIGN PATENT DOCUMENTS

JP    2005-64636    3/2005

OTHER PUBLICATIONS

International Search Report dated Jun. 21, 2005, from the corresponding International Application.
Yutaka Kikuchi, et al. "A Method of Exploring Distribution Trees of IPv6 Multicast" Information Processing Society of Japan, vol. 2002, No. 61, Jun. 28, 2002, pp. 49-54.

* cited by examiner

*Primary Examiner*—Pankaj Kumar
*Assistant Examiner*—Anez Ebrahim
(74) *Attorney, Agent, or Firm*—Katten Muchin Rosenman LLP

(57) ABSTRACT

In accordance with an instruction from a network monitoring device (4), a transmission terminal (2T) serving as a source of video information transmits a certain amount of monitoring test packets differentiated from the usual multicast frames. Pass status information (for example, MIB information) generated by routers (3) receiving and passing through the continuous test packets is collected at the network monitoring device (4). The device (4) uses the collected pass status information and topology information which the device (4) holds by itself so as to judge the direction of transmission of the test packets at the interface of each router (3) and specifies the multicast tree based on the results of judgment.

13 Claims, 25 Drawing Sheets

TOPOLOGY MANAGEMENT TABLE (Router 1)

| PORT NUMBER | NEIGHBORING ROUTER | NEIGHBORING PORT | JUDGMENT CONDITIONS | ROUTE STATUS |
|---|---|---|---|---|
| P1 | Router 2 | P2 | | |
| P2 | Router 3 | P1 | | |
| P3 | Router 5 | P1 | | |

| PORT NUMBER | NEIGHBORING ROUTER | NEIGHBORING PORT | JUDGMENT CONDITIONS | | ROUTE STATUS |
|---|---|---|---|---|---|
| P1 | Router 2 | P2 | ● | ○ | |
| P2 | Router 3 | P1 | ● | ● | |
| P3 | Router 5 | P1 | ○ | ○ | |

FIG.8

● ● : PATH NOT YET SET

| PORT NUMBER | NEIGHBORING ROUTER | NEIGHBORING PORT | JUDGMENT CONDITIONS | | ROUTE STATUS |
|---|---|---|---|---|---|
| P1 | Router 2 | P2 | ● | ○ | → |
| P2 | Router 3 | P1 | ● | ● | × |
| P3 | Router 5 | P1 | ○ | ○ | ↔ |

TTL=3 : Router 5  TTL=5 : Router 2, Router 5
TTL=4 : Router 1  TTL=6 : Router 6

| PORT NUMBER | NEIGHBORING ROUTER | NEIGHBORING PORT | ROUTE STATUS |
|---|---|---|---|
| P1 | Router 2 | P2 | ⟶ |
| P2 | Router 3 | P1 | ✕ |
| P3 | Router 5 | P1 | ⟷ |

FIG.12

[NUMBER OF BYTES OF EACH INTERFACE]

- etherStatsUndersizePkts:NUMBER OF RECEIVED PACKETS WITH LENGTH LESS THAN 64 bytes←Pt
- etherStatsOversizePkts:NUMBER OF RECEIVED PACKETS WITH LENGTH OVER 1518 bytes
- etherStatsPkts64Octets:NUMBER OF RECEIVED PACKETS WITH LENGTH OF 64 bytes
- etherStatsPkts65to127Octets:NUMBER OF RECEIVED PACKETS WITH LENGTH OF 65 TO 127 bytes
- etherStatsPkts128to255Octets:NUMBER OF RECEIVED PACKETS WITH LENGTH OF 128 TO 255 bytes
- etherStatsPkts256to511Octets:NUMBER OF RECEIVED PACKETS WITH LENGTH OF 256 TO 511 bytes
- etherStatsPkts512to1023Octets:NUMBER OF RECEIVED PACKETS WITH LENGTH OF 512 TO 1024 bytes
- etherStatsPkts1024to1518Octets:NUMBER OF RECEIVED PACKETS WITH LENGTH OF 1024 TO 1518 bytes

FIG.13

[NUMBER OF BYTES OF EACH TRANSMITTING/RECEIVING ADDRESS]

- addressMapNetworkAddress:IP ADDRESS OF ENCODER TRANSMITTING TEST PACKETS

- addressMapSource:PHYSICAL PORT RECEIVING SAID IP ADDRESS

- nlMatrixSDOctets:NUMBER OF BYTES WHERE IP ADDRESS IS TRANSMITTED TO THE MULTICAST ADDRESS DESTINATIONS OF MONITORED OBJECT

FIG.14

[ICMP]

- addressMapNetworkAddress:IP ADDRESS OF ENCODER TRANSMITTING TEST PACKETS

- addressMapSource:PHYSICAL PORT RECEIVING SAID IP ADDRESS

- icmpOutTimeExcds:NUMBER OF BYTES OF ICMP time exceed TRANSMITTED BY ROUTER

FIG. 27
(a)
EtherFRAME(14 bytes+FCS OF 4 bytes)
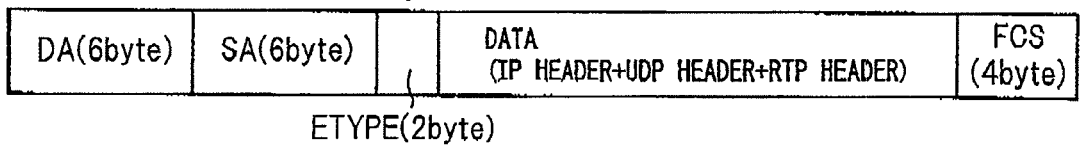
ETYPE(2byte)
(b)
IP HEADER(20 bytes)
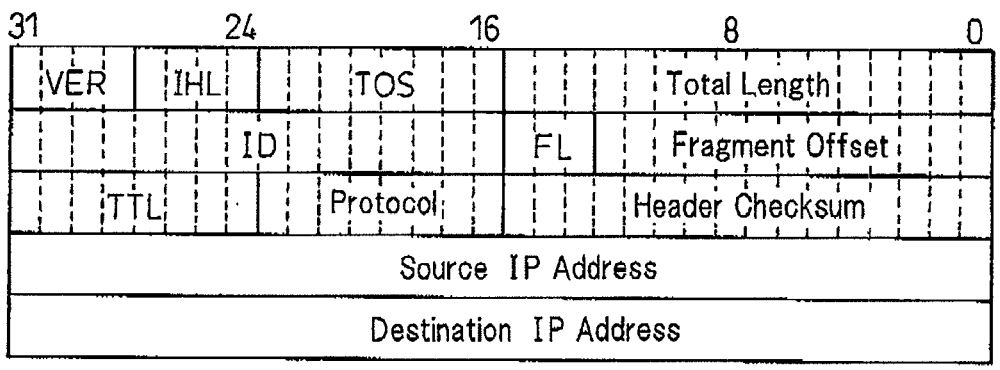
(c)
UDP HEADER(8 bytes)
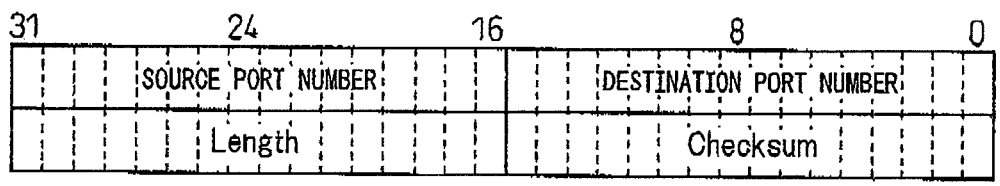
(d)
RTP HEADER(12 bytes)
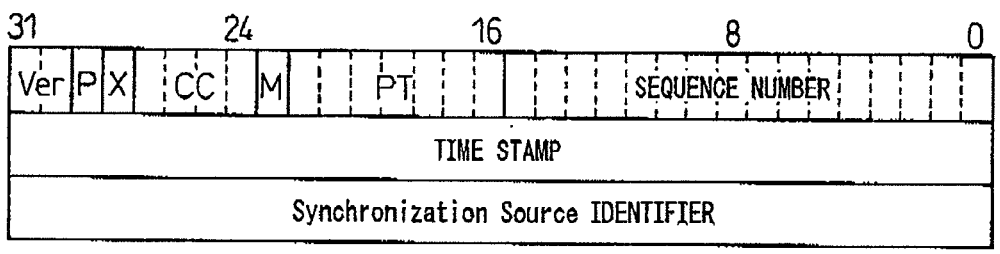
P : Padding, X : Extension, CC : CSRC count, M : Marker

MULTICAST TREE MONITORING METHOD AND SYSTEM IN IP NETWORK

TECHNICAL FIELD

The present invention relates to a multicast tree monitoring method and a multicast tree monitoring system in an IP (Internet Protocol) network and further to a network monitoring device, router, and transmission terminal thereof.

BACKGROUND ART

Stream-type IP multicast networks which use multicast IP addresses to transmit for example video information from one transmission terminal to a large number of members (receiving terminals) are being constructed and are being used by large numbers of users, In this case, this video information is transferred as multicast frames via predetermined routers over the IP network to be provided to predetermined members. At this time, naturally, the video information must accurately reach all of the predetermined members. Further, this video information must not end up being transmitted by mistake to destinations other than those of the predetermined members. that is, the transmission routes of the multicast frames must be the designed transmission routes. Verifying that they are the designed transmission routes is important for, e.g., the carriers.

The above transmission routes, in the case of multicast transmission, form a tree structure on the IP network, therefore such a form of the transmission routes is generally called a "multicast tree". To verify that the multicast frames are actually being transferred along the designed transmission routes, so-called "multicast tree monitoring" is performed by for example the carriers at various times such as the start of transmission of the video information or at the time of occurrence of a fault. The present invention refers to a method and a system for such "multicast tree monitoring".

Note that as known technology related to the present invention, there is the following Patent Document 1. This Patent Document 1 describes to "set a field management process (FM) on a network, set field client processes (FC) at the hosts (1 to 3), set a subnet monitoring process (SM) in each subnet, have the field management process (FM) decide the connection points between the subnets when the field management process (FM) receives a request for generation of an information bus as a means for communication among a plurality of terminals on the network via the field client processes (FC) from the user, and emit and set instructions for setting multicast tunneling to the subnet monitoring processes (SM) in response to this so that the terminals designate the multicast addresses and transmit "data and dynamically generate the information bus which supports communication between groups"

so as to thereby dynamically construct a logical multicast network and promote efficient utilization of computer resources and network resources.

Further, as prior art known to persons skilled in the art, there is the technique of multicast monitoring explained with reference to FIG. 28 and FIG. 29 explained later. However, the technique of this prior art has problems as will be described later.

[Patent Document 1] Japanese Patent Publication (A) No 2001-156855.

DISCLOSURE OF THE INVENTION

Problem To Be Solved By The Invention

FIG. 28 is a diagram showing a case study of a fault in an IP multicast network. The figure, as an example, shows the state where video information from a transmission terminal (camera) is transmitted along a multicast tree through a plurality of routers to a plurality (in the figure, two) receiving terminals.

Here, for example, assume that an error in setting the parameters of the equipment results in a transmission route different from the design (in the figure, see the multicast path (route) shown by the broken line arrow) being formed. This being the case, multicast traffic is transferred to this mistaken route and, for example, the service by the HTTP server in the figure ends up being stopped. That is, the service goes down as shown by the x mark in the figure. To prevent this kind of fault from occurring, it is necessary to verify the routes of the multicast tree in advance. Further, when such a fault ends up occurring, it is necessary to quickly identify the fault location and restore the service.

In the past, the practice has been to (1) log in to each router by the telnet etc, and individually collect the information on the settings of the parameters relating to the multicast. Consequently, there was the problem that the method of setting differed for each device and it was necessary to know the methods for confirming the setting information for all the devices.

(2) Further, as shown in FIG. 29, to confirm communication of the actual operating tree, it was necessary to perform a ping or traceroute operation toward the terminals of the individual destinations, but with this, when there were many destinations, the processing required tremendous time. Further, the unicast route (in the figure, the route of SPT) and the multicast path (in the figure, the route of RPT) are not always the same, so there was the second problem that the correct route could not be confirmed. Note that in the figure, the notations have the following meanings:

RPT: Rendezvous Point Tree

SPT: Shortest Path Tree

DR: Designated Router

The problem of the above (2) will be explained in further detail as follows.

In an IP network, multicast transmission using a multicast control protocol called the "PIM-SM (Protocol Independent Multicast Sparse Mode)" is being widely used. With the PIM-SM, there are cases where a router set at a RP (Rendezvous Point) multicasts to all destinations and cases where the RP load is lightened by distributing the packets to several destinations using a DR (Designated Router) connected to the transmission source and transmitting them according to unicast routing.

With this kind of PIM-SM, it is necessary to investigate in detail the setting information of the routers, i.e., whether the packets are being transmitted from the transmission source to the destinations through an RP (RPT=RP Tree) or are being transmitted by unicast routing from the transmission source (SPT: Shortest Path Tree). Further, with transmission by an RPT, since the route is different from the unicast routing, even if trying to confirm communication end to end, the confirmation cannot be performed by a ping, traceroute, or other operation.

Consequently, the present invention, considering the above problems, has as its object the provision of a method and system for monitoring a multicast tree which does not require knowledge of the method for confirming setting information for all devices, which does not demand performance of the previously stated ping operation etc., and therefore enables both confirmation of the multicast tree and confirmation of communication and quality in a short time by using a simple technique.

Means for Solving the Problems

In the present invention, a certain amount of monitoring test packets, differentiated from usual multicast frames is transmitted continuously from a source of transmission of video information, for example, a transmission terminal (2T), in accordance with an instruction from a network monitoring device (4). The network monitoring device (4) collects pass status information (for example, MIB information) generated by each router (3) which receives the continuous test packets and passes therethrough. The network monitoring device (4) uses the collected pass status information and topology information which is held by itself to judge the transmission directions of the test packets at each router (3), and searches for and specifies the multicast tree based on the results of the judgment.

Due to this, the monitoring of the multicast tree, which used to take several hours, can be completed in several minutes.

BRIEF DESCRIPTION OF THE DRAWINGS

FIG. 7 is a view showing the results of judgment by a judgment unit 33 with the items of the judgment conditions embedded, FIG. 8 is a view illustrating the results of judgment of the route status.

FIG. 9 is a view illustrating the results of judgment by a final judgment unit 33.

FIG. 12 is a view showing a first example of objects of an MIB.

FIG. 13 is a view showing a second example of objects of an MIB.

FIG. 14 is a view showing a third example of objects of an MIB.

FIGS. 27(a) to (d) are views showing the header format of a transmission frame.

BEST MODE FOR CARRYING OUT THE INVENTION

Figure 1:
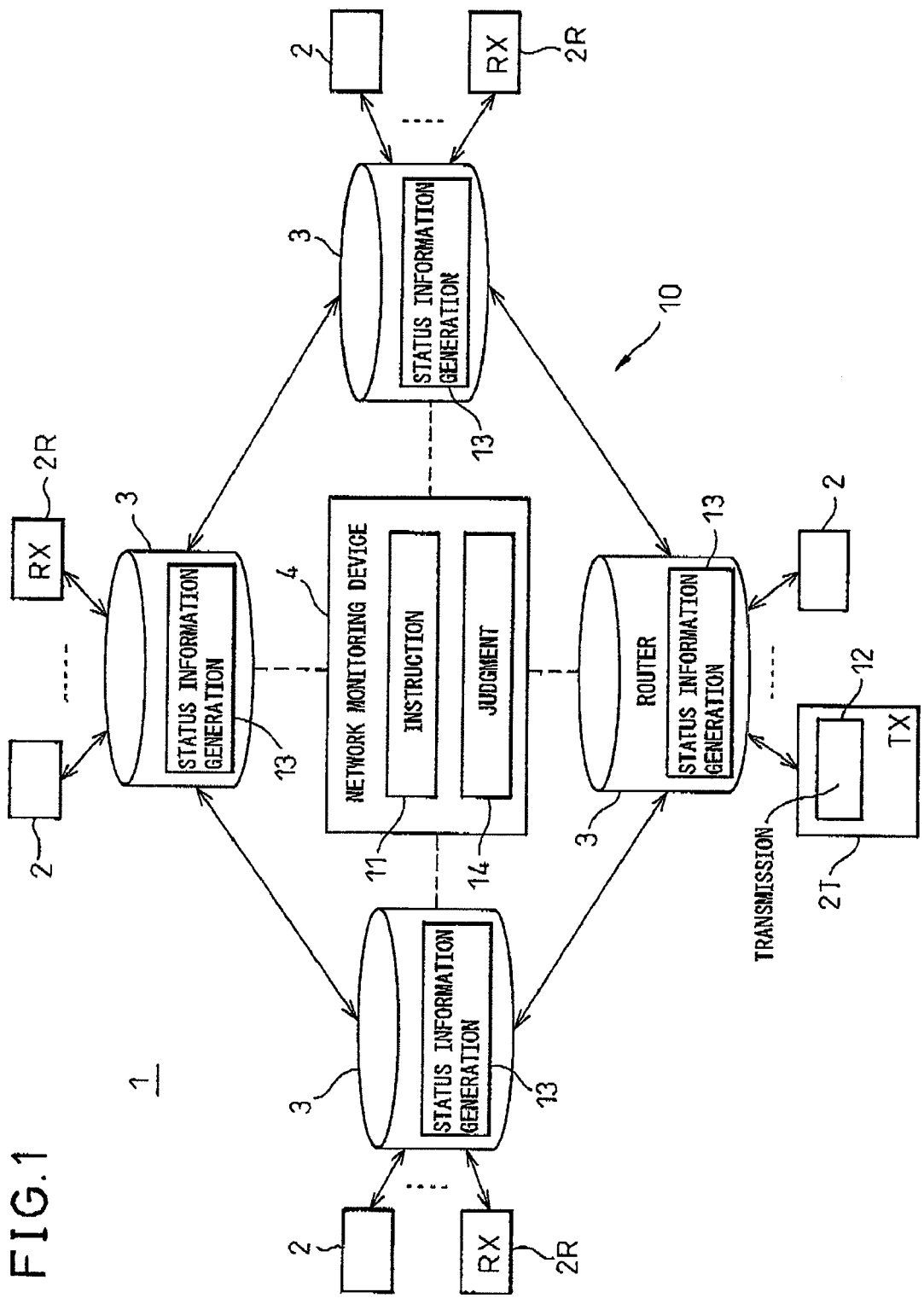
FIG. 1 is a view showing the basic configuration of a multicast tree monitoring system 10 according to the present invention.

FIG. 1 is a view showing the basic configuration of a multicast tree monitoring system according to the present invention. The monitoring system is shown by reference numeral 10. Typical components (described later) are shown by reference numerals 11 to 14. The multicast tree monitoring system 10 according to the present invention can be formed within an IP network 1.

This IP network 1, as illustrated, is comprised of terminals 2, routers 3, and a network monitoring device 4 which searches for the transmission routes of the multicast frames. Explaining this in a little more detail, this IP network 1 is comprised of a transmission terminal (TX) 2T transmitting multicast frames, a plurality of receiving terminals (RX) 2R receiving the multicast frames, and a plurality of routers 3 on tree-shaped multicast frame transmission routes from this transmission terminal 2T to the plurality of receiving terminals 2R.

The multicast tree monitoring system 10 formed in this IP network 1, as previously explained, is typically comprised of an instruction functional part 11, a transmitting functional part 12, a status information generating functional part 13, and a judgment functional part 14. The main functions of these functional parts 11 to 14 are as follows.

The instruction functional part 11 is provided in the network monitoring device 4 and is provided with a function of instructing the transmission terminal 2T to transmit monitoring test packets differentiated from normally transmitted multicast frames, the transmitting functional part 12 is provided in the transmission terminal 2T and is provided with a function of transmitting the test packet toward the routers 3 in accordance with the instruction, the status information generating functional part 13 is provided in each router 3 receiving and passing the transmitted test packets and is provided with a function of generating pass status information of the passed test packets, and the judgment functional part 14 is provided in the network monitoring device 4 and is provided with a function of judging the transmission directions of the test packets on the IP network 1 based on the pass status information collected from the routers 3 and specifying the tree-shaped multicast frame transmission routes based on the results of judgment.

Figure 2:
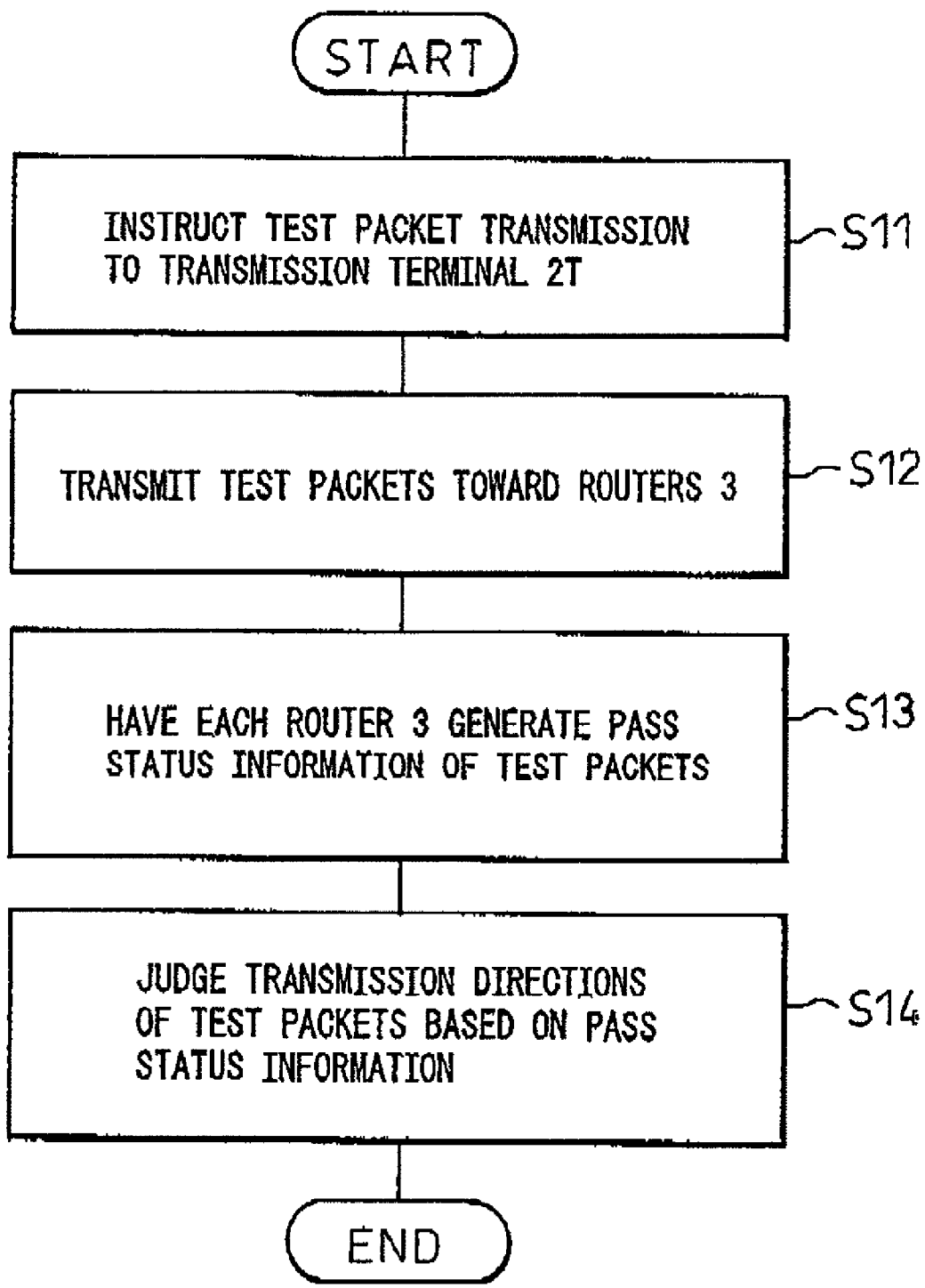
FIG. 2 is a flow chart showing a monitoring operation of the multicast tree monitoring system 10 shown in FIG. 1.

FIG. 2 is a flow chart showing the multicast tree monitoring method executed in the multicast tree monitoring system 10 of the above FIG. 1. That is, the multicast tree monitoring method according to the present invention for searching for the transmission routes of the multicast frames by the network monitoring device 4 is executed by steps S11 to S14 shown in the figure.

Step S11: The network monitoring device 4 instructs the transmission terminal 2T to transmit monitoring test packets differentiated from normally transmitted multicast frames, Step S12: The transmission terminal 2T transmits the test packets toward the routers 3 in accordance with the instruction, Step S13: Each of the routers 3 receiving and passing the transmitted test packets generates pass status information of the test packets, Step S14: The network monitoring device 4 judges the transmission directions of the test packets on the IP network 1 based on the pass status information collected from the routers 3 and specifies the tree-shaped transmission routes based on the results of judgment.

More specifically, in the first step S11, the monitoring test packets are selected from any of (i) packets having a data length that is usually not adopted as the multicast frames, (ii) packets which have an unused transmission IP address or unused destination multicast IP address, and (iii) packets set with an effective time period TTL (Time To Live) of the packets of from 1 up to a predesignated N and a predetermined certain amount of the test packets is continuously transmitted.

Further, at the third step S13, the pass status information is preferably generated as network management database MIB (Management Information Base) information.

Furthermore, at the fourth step S14, the judgment is performed by referring to a topology management table, in the network monitoring device 4, holding the connections with the neighboring routers.

The basic concept of the system and method according to the present invention was shown referring to FIG. 1 and FIG. 2. Next, this will be shown while referring to more specific embodiments.

Figure 3:
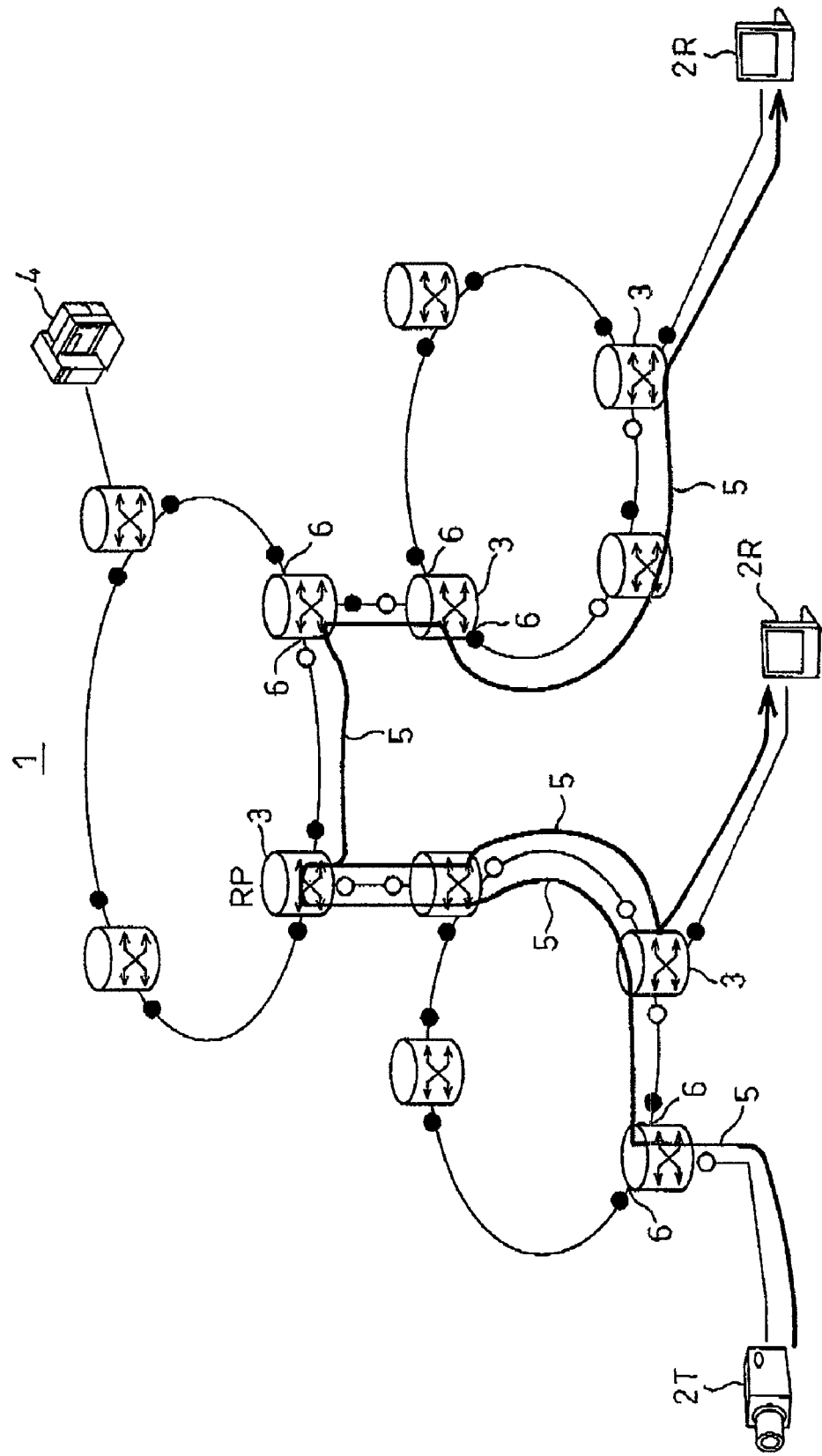
FIG. 3 is a view showing a specific image of an IP network 1 to which the multicast tree monitoring system based on the present invention is applied.

FIG. 3 is a view showing a specific image of the IP network 1 to which the multicast tree monitoring system based on the present invention is applied. Note that throughout all of the figures, similar components are assigned the same reference numerals or symbols.

The figure specifically shows the IP network 1. The description of the multicast tree monitoring system explained above (reference numerals 11 to 14 of FIG. 1) is omitted. This is to make the image of the transmission routes of the multicast tree according to the present invention much easier to understand. That is, referring to this figure, the state where the multicast frames (video information) from the transmission terminal 2T (in the example of the figure, a camera) pass through predetermined routers 3 on the IP network 1 and are transferred to predetermined receiving terminals 2R (in the example of this figure, computers) is shown. Here, the transfer routes become transmission routes 5 forming the multicast tree.

First, looking at the network monitoring device 4, this includes the instruction functional part 11 and judgment functional part 14 of FIG. 1. Note that this network monitoring device 4, for example, the multicast tree monitor server, is usually provided in the IP network 1. This existing server has the functional parts 11 and 14 newly added to them according to the present invention. This network monitoring device 4 includes, further, a topology management table, status information (MIB) collection unit, and the like.

On the one hand, the transmission terminal (shown as a camera) 2T of FIG. 3 is a so-called multicast stream transmission device. When there is a test packet transmission instruction from the network monitoring device 4, the transmission device (2T) sends test packets comprised of any of (i) packets having a data length that is usually not adopted as the multicast frames, (ii) packets which have an unused source IP address or unused destination multicast IP address, and (iii) packets set with an effective time period TTL (Time To Live) of the packets of from 1 up to a predesignated N and to the transmission routes 5. That is, it continuously sends a certain amount of frames as test packets almost never existing as multicast frames Continuously sending a predetermined amount of such test packets on the network is a characterizing feature of the present invention. By investigating the flows of the test packets at the interfaces (ports) 6 of the routers 3, it is possible to search for the transmission routes of the test packets from the transmission terminal 2T to the receiving terminals 2R and thereby specify the multicast tree.

That is, if measuring the inflow of the test packets at each interface 6 and clarifying that the test packet "inflow is small" at the interfaces 6 with the black dots in FIG. 3 and the test packet "inflow is large" at the interfaces 6 with the white dots at the network monitoring device 4, the transmission routes forming the multicast tree become as shown by the arrow 5 of the figure.

By just sending a large amount of test packets over is the network in a short time and investigating the inflow in this way, the monitoring (search) of the multicast tree is completed, so the time required for this monitoring is at most several minutes. This means a reduction of time to about 1/60 compared with the several hours required in the past.

Here, the components forming the multicast tree monitoring system 10 will be shown more specifically.

Figure 4:
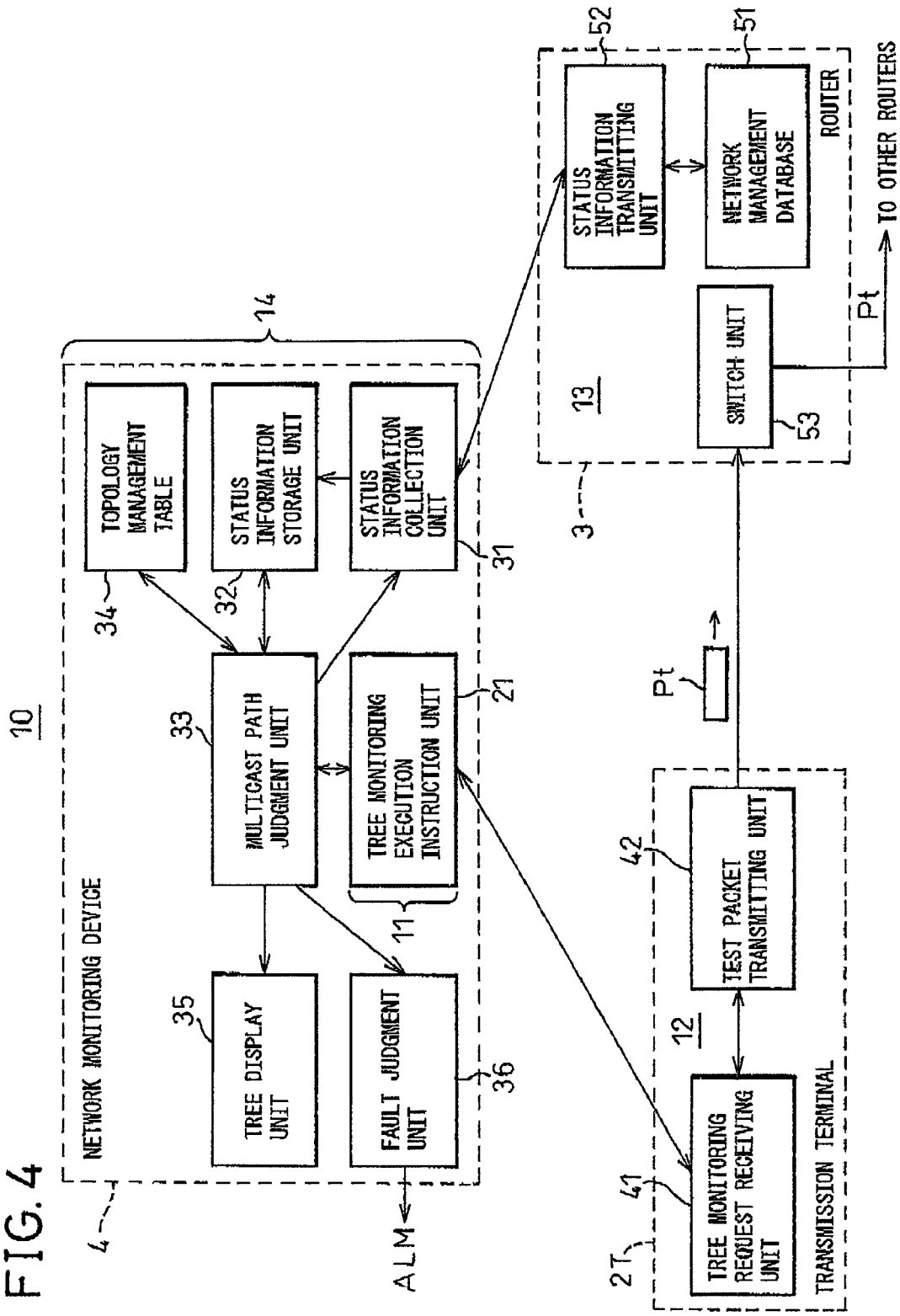
FIG. 4 is a view showing an example of a specific configuration of the multicast tree monitoring system 10 based on the present invention.

FIG. 4 is a view showing an example of the specific configuration of a multicast tree monitoring system 10 based on the present invention.

First, if looking at the network monitoring device 4, in the above FIG. 1, this device 4 was shown as both an instruction functional part 11 which instructs the transmission terminal 2T to transmit monitoring test packets differentiated from the normally transmitted multicast frames and a judgment functional part 14 which judges the transmission directions of the test packets on the IP network 1 based on the pass status information of the test packets generated by each router 3 which received and passed the transmitted test packets and specifies the tree-shaped multicast frame transmission routes by the results of judgment, but in FIG. 4, the instruction functional part 11 is comprised of the tree monitoring execution instruction unit 21. Further, regarding the judgment functional part 14, this is comprised of a status information collection unit 31 which collects the pass status information from each router 3, a status information storage unit 32 which stores the collected pass status information, and a multicast path judgment unit 33 which judges the transmission directions based on the stored pass status information.

This judgment functional part 14, particularly the multicast path judgment unit 33, is designed to perform the above judgment when the difference between the pass status information, stored in the status information storage unit 32, immediately before the transmission of the test packets and the pass status information after the transmission of the test packets is large. This is because the fact that the difference is large means that the test packets passed through the routers 3.

Further, the judgment functional part 14 has the topology management table 34 holding the connections with the neighboring routers and refers to it for judgment of the transmission directions.

Furthermore, the judgment functional part 14 preferably has a tree display unit 35 for displaying the tree-shaped multicast frame transmission routes 5 specified by the results of judgment to the operator.

Next, looking at the transmission terminal 2T, in the above FIG. 1, the terminal 2T was shown as the transmitting functional part 12 which receives the instruction from the network monitoring device 4 to transmit the monitoring test packets differentiated from the normally transmitted multicast frames and transmits the test packets to the routers 3, but in FIG. 4, the transmitting functional part 12 is comprised of both a tree monitoring request receiving unit 41 which receives the instruction from the network monitoring device 4 to transmit the monitoring test packets and a test packet transmitting unit 42 which receives the instruction and generates and transmits the test packets Pt.

The test packets Pt generated and transmitted by this test packet transmitting unit 42 are selected from any of the previously stated packets (i), (ii), and (iii). A predetermined certain amount of the test packets Pt is continually transmitted.

Next, if looking at the routers 3, in the FIG. 1, each router 3 was shown as the status information generation functional part 13 generating the pass status information of the test packets when receiving and passing the test packets Pt transmitted by the transmission terminal 2T for use for the search by the network monitoring device 4, but in FIG. 4 this status information generation functional part 13 is comprised of a network management database (MIB) 51 and a status information transmitting unit 52 transmitting the pass status information generated from this network management database (MIB) 51 to the network monitoring device 4 directly or via the transmission terminal 2T. Note that the switch unit 53 performs the role of the existing inherent routing of the router 3.

Note that as explained later referring to FIG. 26, according to the multicast tree monitoring method of the present invention, the function of fault detection in the IP network 1 can be simply realized. Due to this, the judgment functional part 14 shown in FIG. 4 can be further provided with a fault judgment unit 36 generating fault detection information ALM when judging that the tree-shaped multicast frame transmission routes 5 specified by the results of judgment by the judgment unit 33 do not reach all of the receiving terminals 2R which should receive the multicast frames.

According to the actual example of configuration of the multicast tree monitoring system 10 shown in FIG. 4, the network monitor device 4 is a "multicast tree monitor server", and the status information collection unit 31 is an "SNMP transmitting/receiving unit" (SNMP: Simple Network Management Protocol). Further, the status information storage unit 32 is an "MIB information storage unit". Furthermore, the transmission terminal 2T shown in FIG. 4 is a "multicast frame transmission device", and the network management database (DB) in each router 3 shown in FIG. 4 is an "MIB" and the status information transmitting unit is an "SNMP transmitting/receiving unit". In such an actual example of the configuration, the multicast tree monitoring system 10 of the present invention is comprised of a multicast tree monitor server (4), multicast frame transmission device (2T), and routers 3.

In this multicast tree monitor server (4), the multicast path judgment unit 33 instructs the transmission of test packets for tree monitoring to the multicast frame transmission device (2T), acquires the MIB information from the routers 3 by instructing the collection of the MIB (for example, RMON (Remote Network Monitoring) MIB) to the SNMP transmitting/receiving unit (31), collects the MIB information collected from the MIB information storage unit (32), obtains the connections of each router 3 from the topology management table 34, and notifies, to the tree display unit 35, the resultant construction of the tree from the transmission device (2T) to the receiving terminals 2R.

Using these components, it is possible to verify the interfaces through which the multicast test packet flow and their flow directions.

Further, the tree monitoring execution instruction unit 21 notifies the multicast frame transmission device (2T) of the addresses of the transmitted test packets, the packet sizes of the test packets, the TTL, and the port numbers to the transmission device (2T) and notifies the results of execution from the transmission device (2T) to the multicast path judgment unit 33. Due to this, it is possible to extract the MIB information and the time exceeded packets at the ICMP (Internet Control Message Protocol) required for identification of the tree.

The topology management table 34 stores the physical connection information of each router 3 with the neighboring routers. Due to this, it can be learned which interfaces the multicast test packets use.

The MIB information storage unit (32) stores the MIB information collected from the routers 3. Due to this, the multicast path judgment unit 33 can analyze the necessary MIB information.

The SNMP transmitting/receiving unit 31 is designed to execute an SNMP command for collecting the MIB information from the routers 3 in accordance with an instruction from the multicast path judgment unit 33. Due to this, it can collect information stored in the MIB information storage unit (32).

Furthermore, the tree display unit 35 is designed to be able to display the configuration of the tree recognized by the multicast path judgment unit 33 to the operator. Due to this, visualization of the tree is achieved and convenience is obtained.

In the multicast stream transmission device (2T), the tree monitoring request receiving unit 41 is designed to receive instructions and parameters from the tree monitoring execution instruction unit 21 of the multicast tree monitor server (4) and instruct the execution of transmission to the test packet transmitting unit 42 and to return the end of transmission and results of reception of the time exceeded packets at the ICMP to the multicast tree monitor server (4).

The test packet transmitting unit 42 is designed to transmit the test packets by the specified address, TTL, port number, and packet size. Due to this, the multicast tree monitor server (4) can collect the necessary MIB information and the like.

In each router 3, the switch unit 53 is designed to route test packets from the multicast frame transmission device (2T). Due to this, the test packets can be routed to other routers or the receiving terminals 2R.

The SNMP transmitting/receiving unit (52) is designed to respond with the MIB information to an SNMP request from the multicast tree monitor server (4). Due to this, the multicast tree monitor server can collect the necessary MIB information.

The MIB (51) is designed to collect the number of received packets and the like based on the reception of the test packets. Due to this, the multicast tree monitor server (4) can collect the necessary MIB information.

Here, when again referring to FIG. 3, in the multicast tree monitoring system 10 using the multicast tree monitor server (4), the multicast stream transmission device (2T), and the routers 3 shown in FIG. 4, the server (4) collects the MIB information of each interface and searches for the interfaces with the large inflow of the specific test packets to find the inflow directions of the test packets so as to be able to verify the flow of the multicast test packets. Alternatively, the server (4) can analyze the ICMP time exceeded packets transmitted by routers 3 toward the multicast frame transmission device (2T) and obtain a grasp of the number of hops from the multicast stream transmission device (2T).

Next, the technique for judgment of the multicast tree transmission routes 5 will be explained specifically referring to FIG. 5 to FIG. 11 while focusing on any part in the IP network 1 shown in FIG. 3.

Figures 5, 6:
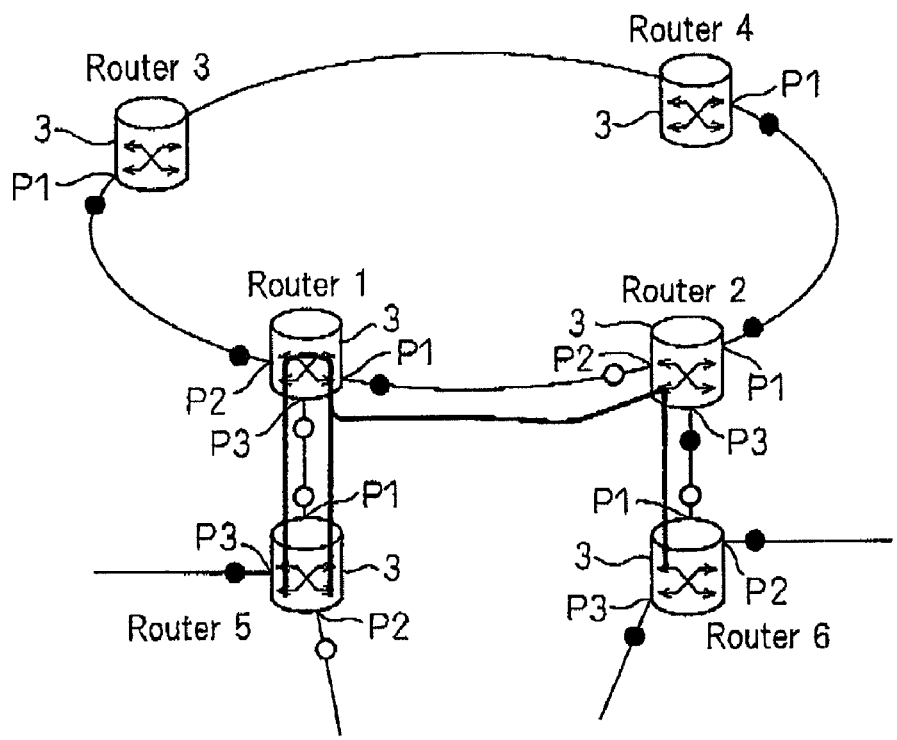
FIG. 5 is the view (part 1) of part of FIG. 3 taken out in order to explain a route judgment operation of the present invention.
FIG. 6 is a view showing an example of the configuration of a topology management table 34.

FIG. 5 is a view showing part of FIG. 3 taken out in order to explain the route judgment operation of the present invention. In this figure, reference numeral 3 represents a router as shown in FIG. 3, In FIG, 5, the routers are shown differentiated such as Router 1, Router 2, . . . Further, in FIG, 5, the interfaces of the routers are shown differentiated as the ports P1, P2, and P3. Note that the black dots and white dots near the ports (P), like the case in FIG. 3, show the magnitude of inflow of the test packets into the interfaces (ports) and show an example of large inflow of test packets to the ports with the white dots. Further, the transmission directions of the multicast packets are specified according to the magnitude of the inflow of the test packets. At the time of specifying the transmission directions, the topology management table (34 of FIG. 4) becomes effective.

FIG. 6 is a view showing an example of the configuration of the topology management table 34. However, this shows the management table for the "Router 1" among the routers 3. The other "Router 2" and "Router 3" are also provided with individual management tables.

Referring to FIG. 5, the ports P1, P2, and P3 of the router (Router 1) 3 are connected to the port P2 of the neighboring Router 2, the port PI of the neighboring Router 3, and the port P1 of the neighboring Router 5, so the contents of the topology management table 34 for the Router 1 become as shown in FIG. 6.

Next, the judgment conditions in Table 34 of FIG. 6 are decided. Consequently, as explained above, first, a large amount of the test packets Pt are transmitted by the transmission terminal 2T (42 of FIG. 4) in a short time. The MIB information generated at each router 3 due to transmission of the test packets are collected (51 of FIG. 4). Furthermore, after collecting the MIB information, this is analyzed, and the transmission direction of the test packets is determined at each port P of each router 3. This is shown in FIG. 7.

FIG. 7 is a view showing the results of judgment by the judgment unit 33 in which the judgment conditions are embedded. Whether the inflow of the test packets is large or small is judged by setting some threshold value and deciding whether the inflow is larger or smaller than it. This threshold value (TH) is made substantially the same value as the amount of test packets transmitted by the transmission terminal 2T (for example, 100 packets) (TH=100). Alternatively, considering some packet loss occurring midway through transmission, it is made a value smaller than 100 (for example, 90<TH<100). Therefore, this threshold value TH is used to determine the black dots and white dots of the items of the judgment conditions. Further, using the black dots and white dots, the above-mentioned pass status information (route status information of the test packets) is judged. This is shown in FIG. 8.

FIG. 8 is a view illustrating the results of judgment of the route status. The right arrow, the left arrow, and the two-headed arrow of the figure show the transmission directions of the test packets at the ports P1, P2, and P3 of the Router 1, that is, the route status (pass status at each router). In the final analysis, the Table 34 shown in FIG. 9 is completed.

FIG. 9 is a view illustrating the results of judgment by the final judgment unit 33. Due to this, the transmission routes of the multicast frames are specified, and the search of the multicast tree is terminated.

Figures 10, 11:
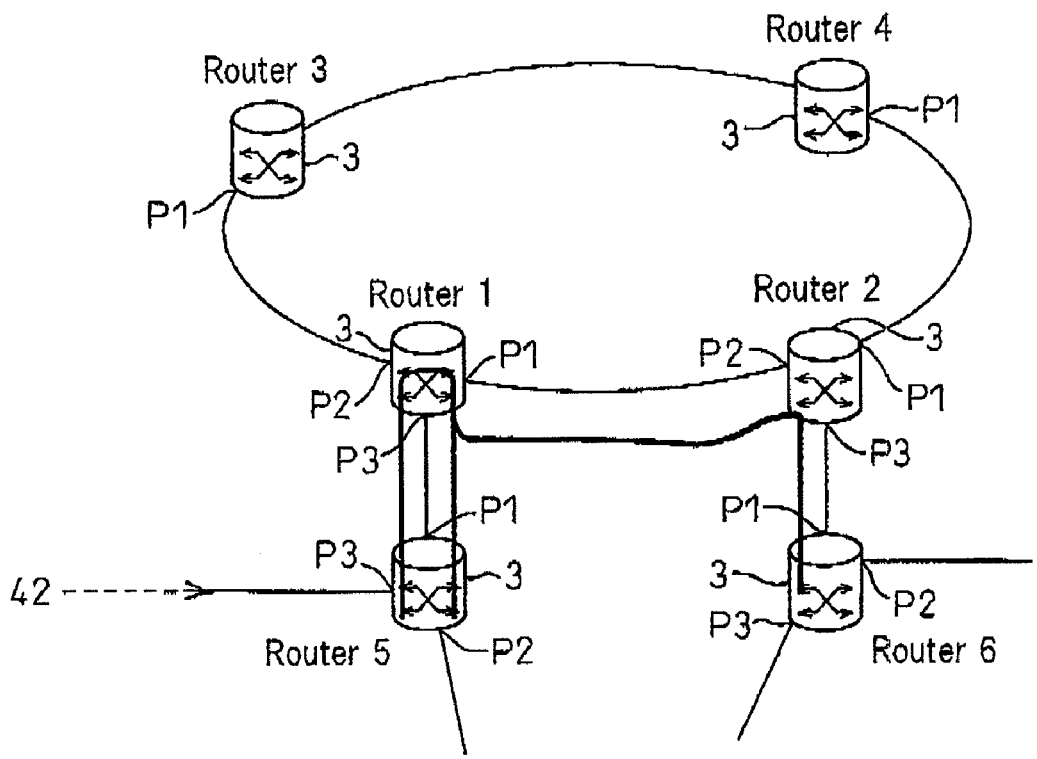
FIG. 10 is the view (part 2) showing part of FIG. 3 taken out in order to explain a route judgment operation of the present invention.
FIG. 11 is a view showing the final results of judgment by the judgment unit 33 based on FIG. 10.

FIG, 10, like FIG. 5, is a view showing part of FIG. 3 taken out in order to explain the route judgment operation of the present invention. It differs from FIG. 5 in not showing black dots and white dots. This is because the test packets used in FIG. 10 are test packets of the third type (iii), that is, the type utilizing the TTL. These differ from test packets of the first type (i) in FIG. 5, that is, of the type using short data lengths and test packets of the second type (ii), that is, of the type using unused source addresses and/or unused destination addresses.

In FIG. 10, the test packets set at TTL=3 and transmitted by the test packet transmitting unit 42 (FIG. 4) are reduced in TTL value by "1" each time passing through a router. For example, when reaching the Router 5 and TTL becomes 0, the time exceeded packets are collected at the status information collection unit 31 directly from this Router 5 (or indirectly via the transmission terminal 2T) (FIG. 4). Similarly, the test packets set to TTL=4 become TTL=0 when reaching the Router 1, then the time exceeded packets are collected at the status information collection unit 31, the test packets set to TTL=5 become TTL=0 when reaching the Router 2 and Router 5, then the time exceeded packets are collected at the status information collection unit 31, and the test packets set to TTL=6 become TTL=0 when reaching the Router 6, then the time exceeded packets are collected at the status information collection unit 31.

FIG. 11 is a view showing the results of judgment by the final judgment unit 33 when the test packets having the above TTL as parameters are utilized. This stands on a network the same as in FIG. 5, so the results of judgment naturally become the same as the results of judgment of FIG. 9.

One of the factors enabling a search of a multicast tree as explained above is, as already stated, the use of monitoring test packets differentiated from normally transmitted multicast frames. These special test packets become special objects in the network management database 51 (as a good example, the above MIB) of FIG. 4. Detection of the test packets at the routers 3 is made extremely easy. The objects of the MIB will be explained in detail.

FIG. 12 is a view showing a first example of the objects of an MIB and shows the first type (i) of the test packets, FIG. 13 is a view showing a second example of the objects of an MIB and shows the second type (ii) of the test packets, FIG. 14 is a view showing a third example of the objects of an MIB and shows the third type (iii) of the test packets.

That is, FIG. 12 shows test packets of the first type (i) having data lengths not usually used as multicast frames as Pt. Packets with data lengths of less than 64 bytes are used as the test packets. FIG. 13 shows the characteristic of test packets of the second type (ii) having unused source IP addresses or unused destination multicast IP addresses. Further, FIG. 14 shows the characteristics of test packets of the third type (iii) with packet effective time periods TTL (Time To Live) set from 1 to a predetermined N.

Explaining the aforementioned FIG. 12, FIG. 13, and FIG. 14 in some more detail, these FIG. 12 to FIG. 14 show the NIB information which becomes necessary for determination of the multicast tree. When monitoring a tree by the inflow of the test packets, it is possible to determine the multicast tree by transmitting frames of less than 64 bytes usually never sent by using for example etherStatsUndersizePkts (FIG. 12) and measuring the inflow.

Alternatively, it is possible to determine the multicast tree by using a specific source IP address or the like, transmitting test packets using that source IP address and destination IP multicast addresses, and using n1MatrixSDoctets for measuring the number of test packets (FIG. 13). In this case, in order to identify the ports to which the test packets flow, collection of addressMapSource (port numbers) and addressMapNetworkAddresses (list of transmission IP addresses input to addressMapSource) also becomes necessary.

Alternatively, it is possible to verify the multicast tree by using icmpOutTimeExcds transmitting the test packets with TTLs set from 1 to N and measuring the number of transmitted packets when transmitting ICMP time exceeded packets showing routers where TTL became 0. In this case, as well, collection of addressMapSource and addressMapNetworkAddress is necessary.

Next, the first, second, and third embodiments using the test packets of the first type (i), the second type (ii), and the third type (iii) will be explained. Note that these first, second, and third embodiments are embodiments of the configurations explained in the above FIG. 4 to FIG. 14 on the IP network 1 of FIG. 3.

Figure 15:
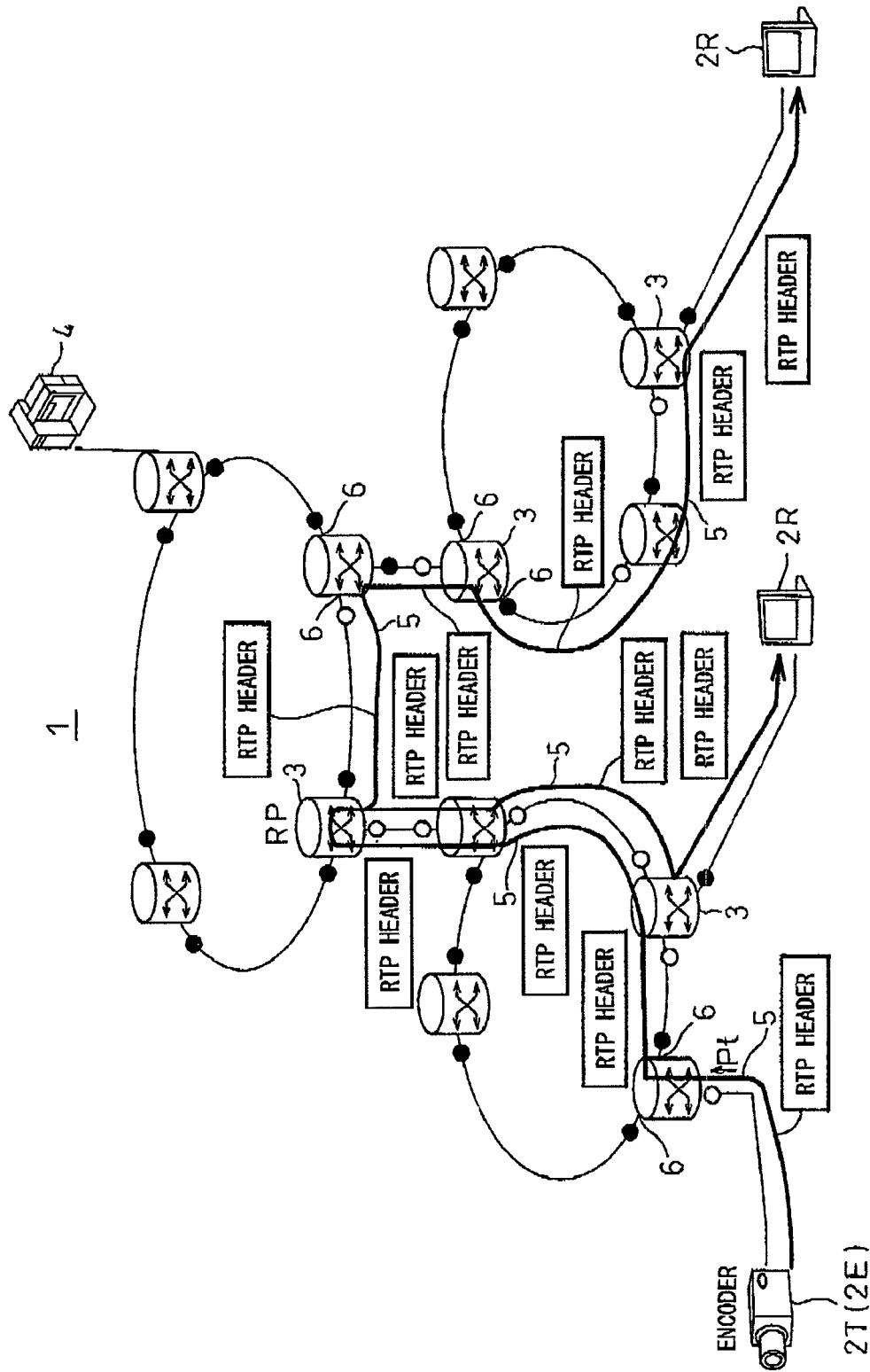
FIG. 15 is a view showing an IP network (FIG. 3) to which the first embodiment of the present invention is applied.
Figure 16:
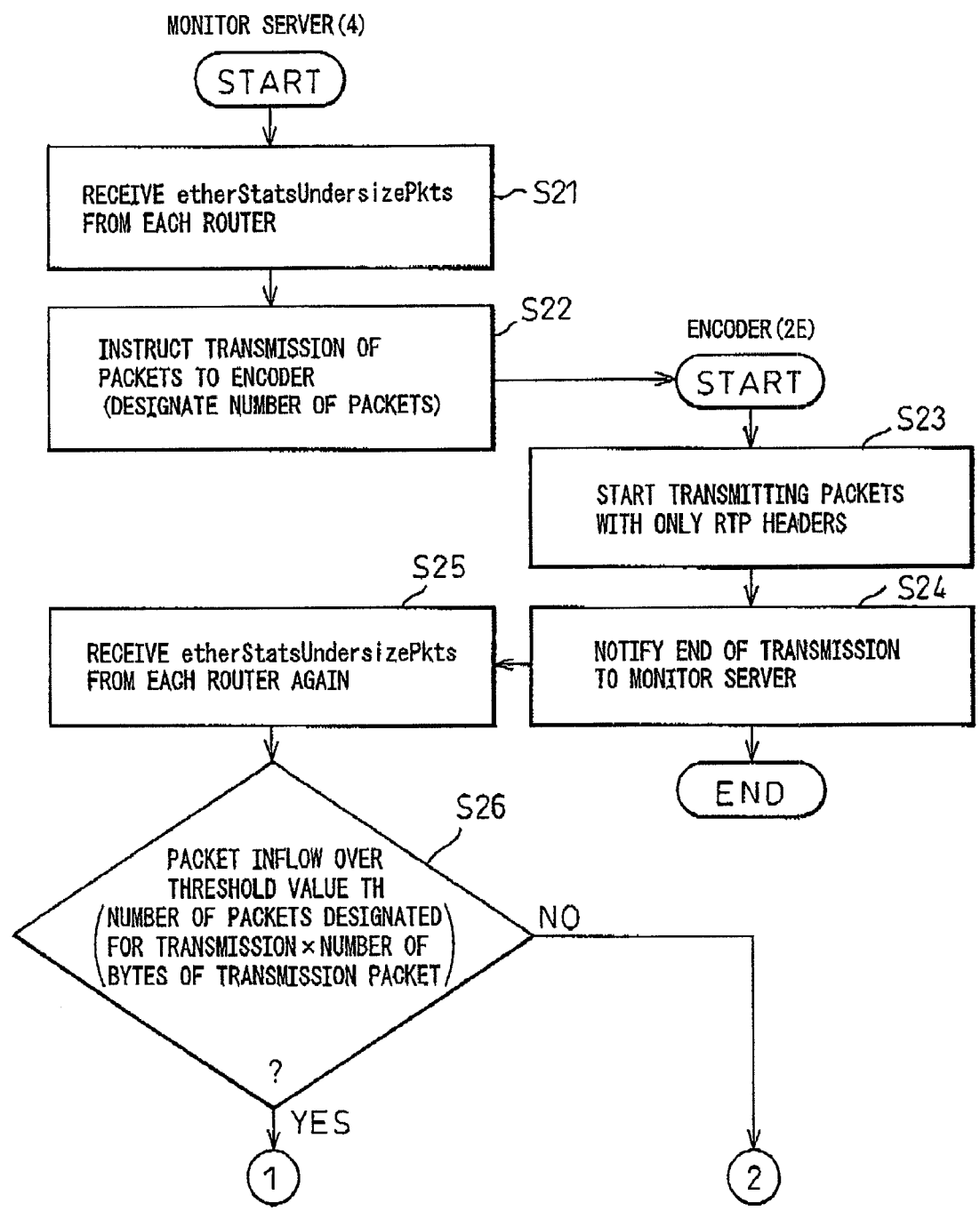
FIG. 16 is a flowchart (part 1) showing the operation of the first embodiment executed in FIG. 15.
Figure 17:
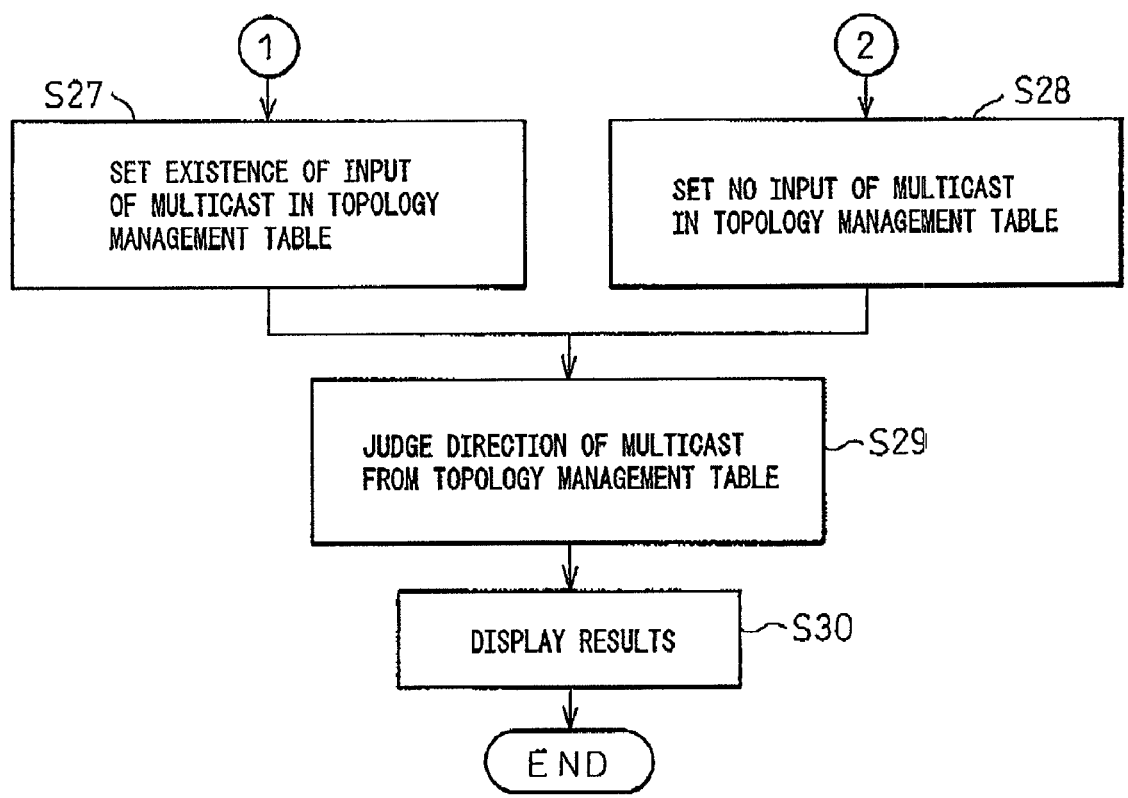
FIG. 17 is a flowchart (part 2) showing the operation of the first embodiment executed in FIG. 15.

FIG. 15 is a view showing an IP network (FIG. 3) to which the first embodiment of the present invention is applied, FIG. 16 is a flowchart (part 1) showing the operation of the first embodiment executed at FIG. 15, and FIG. 17 is the same flowchart (part 2).

First, referring to FIG. 15, the operation under the first embodiment becomes as in the following 1 to 6. Note that as the transmission terminal (multicast frame transmission device), an encoder (2E) which formats video information to the MPEG or the like is shown.

1. Collect MIB (etherStatsUndersizePkts) before test packet transmission from each router 3, 2. Instruct transmission of test packets to encoder (2E), 3. Transmit certain amount of test packets with RTP (Real-time Transfer Protocol) headers only, 4. Again collect MIB (etherStatsUndersizesPkts) information from each router 3, 5. Judge interfaces (ports) having large inflow and the inflow direction, 6. Display multicast tree on display unit 35.

The more detailed flow of the processing will be explained referring to FIG. 16 and FIG. 17.

Step S21: The monitor server (4) receives the count value of the test packets (in the first embodiment, the etherStatsUndersizePkts of the top row of FIG. 12) to be sent from now over the IP network 1 from the MIB (51 of FIG. 4) of each router 3. This is to obtain the initial count value immediately before the monitor test of etherStatsUndersizePkts in the MIB (51). That is, when the inflow of the test packets is much greater than the initial count value, it judges that the test packets passed through that router, Step S22: The monitor server (4) designates the number of test packets to be sent in a large amount in a short time and then instructs the transmission thereof to the encoder (2E).

Step S23: The encoder (2E) receiving the above transmission instruction starts transmission of packets comprised of only the RTP headers as test packets from the test packet transmitting unit (42 of FIG. 4).

Step S24: The encoder (2E) ends the transmission of the test packets, then notifies this end to the monitor server (4).

Step S25: By the end of transmission of the test packets, a router through which the test packets passed should be greatly increased in the MIB information, that is, the count value, of the test packets, that is, the etherStatsUndersizePkts. Therefore, the monitor server (4) receives the information of the count value of the etherStatsUndersizePkts once again from the MIB (51) of each router 3.

Step S26: The monitor server (4) judges by the judgment unit (33 of FIG. 4) whether the count value, that is, the inflow of the test packets, has exceeded the above threshold value TH.

Step S27: If the threshold value TH is exceeded, it is judged that "There is input of a multicast", and this is set in the topology management table 34, Step S28: If the threshold value TH is not exceeded, it is judged that "There is no input of a multicast", and this is set in the topology management table 34. Note that the "There is input of a multicast" and "There is no input of a multicast" correspond to representation in FIG. 9 of white dots and black dots.

Step S30: The pass status of the test packets in each router 3 is thereby learned and this is displayed on a display unit (35 of FIG. 4).

Summarizing the above, the multicast tree monitoring system 10 according to the first embodiment uses a multicast frame transmission device (2T) which transmits packets of less than 64 bytes size almost never sent over the network as monitoring use test packets, a multicast tree monitor server (4) which collects MIB information (etherStatsUndersizePkts) showing the inflow of packets of less than 64 bytes size, and routers 3 which generate MIB information based on the inflow of the test packets and is configured so that the monitor server (4) judges the interfaces (ports) of each router 3 to which packets having the transmission sizes instructed to the transmission device (2T) are input from the MIB information and judges the transmission directions of the frames at the connected interfaces based on the inflow directions of the packets found from the connections shown in the topology management table 34 and the MIB information.

Figure 18:
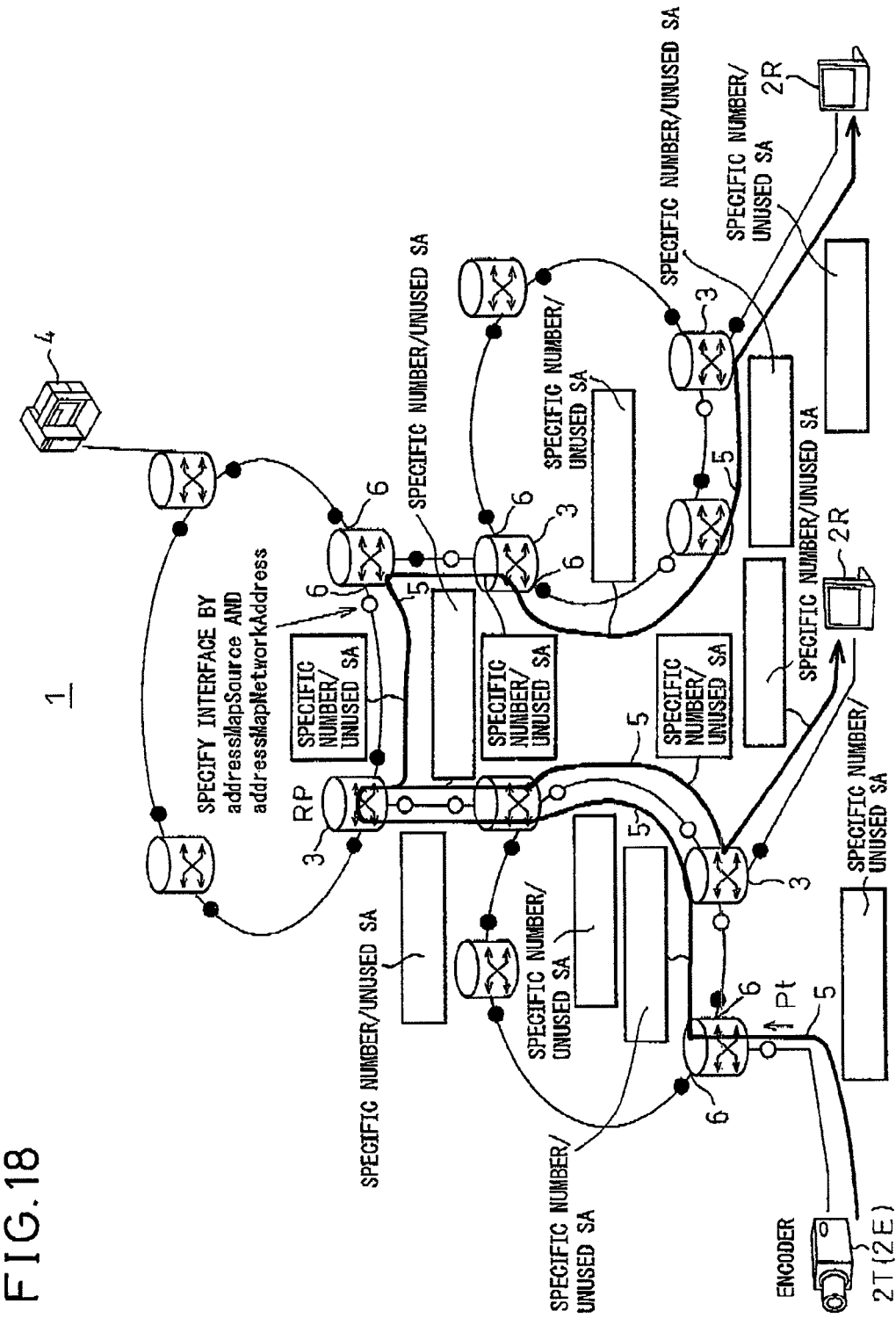
FIG. 18 is a view showing an IP network to which a second embodiment of the present invention is applied (FIG. 3).
Figure 19:
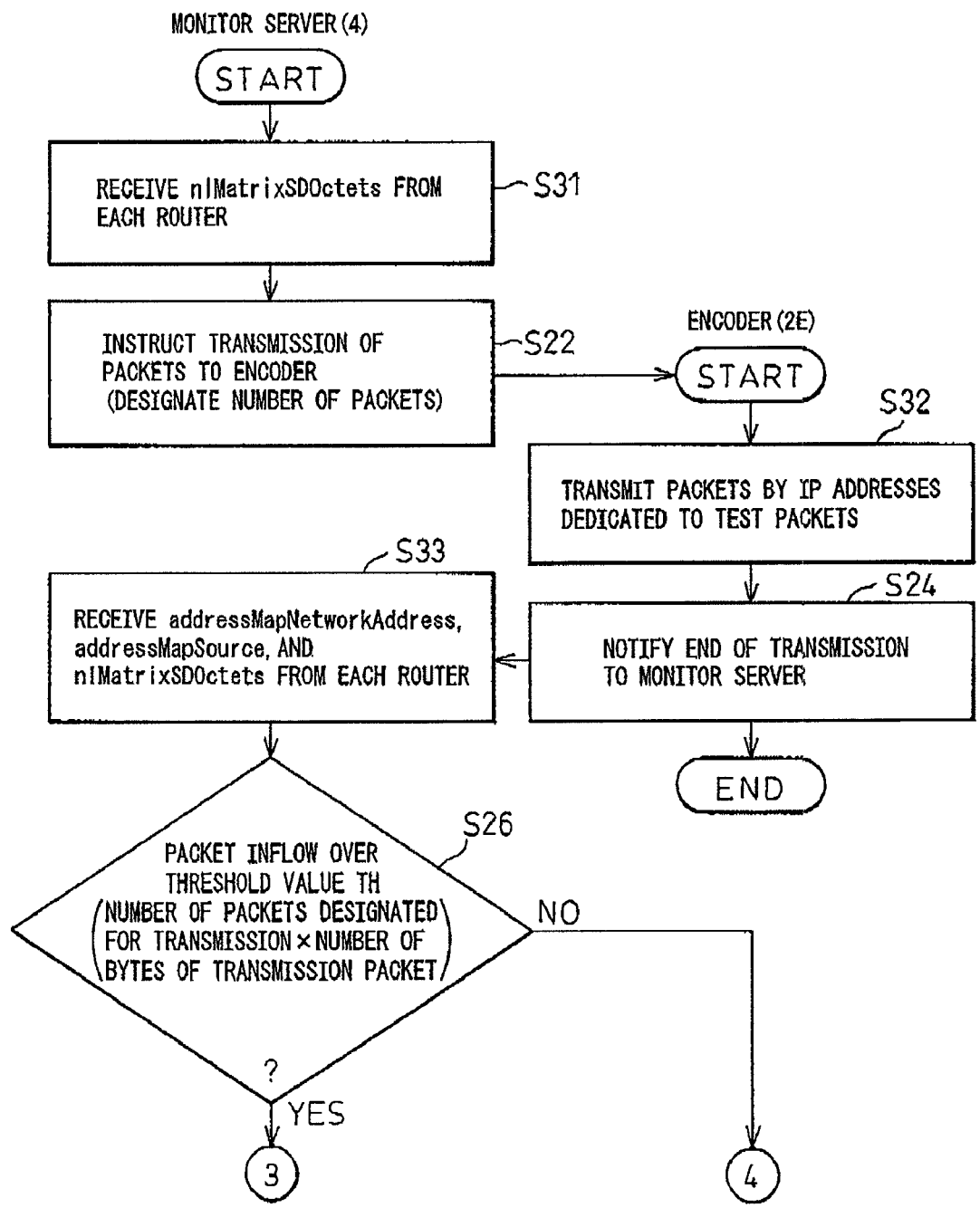
FIG. 19 is a flowchart (part 1) showing the operation of the second embodiment executed in FIG. 18.
Figure 20:
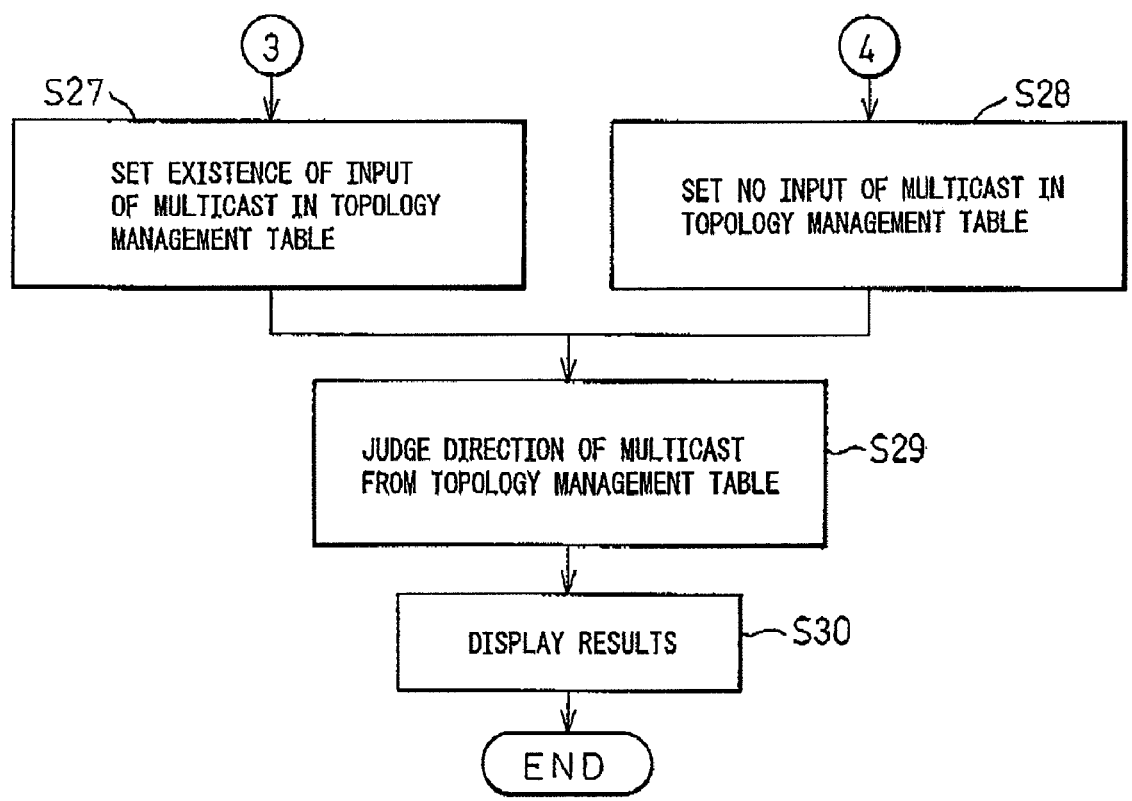
FIG. 20 is a flowchart (part 2) showing the operation of the second embodiment executed in FIG. 18.

FIG. 18 is a view showing an IP network (FIG. 3) to which the second embodiment of the present invention is applied, FIG. 19 is a flowchart (part 1) showing the operation of the second embodiment executed in FIG. 18, and FIG. 20 is the same flowchart (part 2).

First, referring to FIG. 18, the operation under the second embodiment becomes as in the following 1 to 8.

1. Examine unused addresses of encoder (2E) in subnet,

2. Collect MIB (n1MatrixSDOctets) before test packet transmission from each router 3, 3. Designate transmission addresses of test packets and then instruct transmission to encoder (2E), 4. Transmit certain amount of test packets by designated addresses, 5. Collect MIB information (addressMapSource and addressMapNetworkAddress) from each router 3 and specify input ports of the test addresses, 6. Again collect n1MatrixSDOctets, 7. Judge interfaces with large inflow and the inflow directions of same, and 8. Display multicast tree on display unit 35.

The more detailed flow of the processing will be explained referring to FIG. 19 and FIG. 20. Note that among the steps of the flowchart shown in FIG. 19 and FIG. 20, steps substantially the same as the steps of FIG. 16 and FIG. 17 are shown by the same step numbers as the corresponding steps in FIG. 16 and FIG. 17, that is, S22, S24, and S26 to S30.

Consequently, the steps characterizing the second embodiment are S31, S32, and S33.

Step S31: The monitor server (4) receives the count value of the test packets to be sent over the IP network 1 from now (in the second embodiment, the packets shown in FIG. 13) from the MIB (51 of FIG. 4) of each router 3. This is to obtain the initial count value in the MIB (51) immediately before the monitoring test. That is, when the inflow of the test packets right before the test is much greater than the initial count value, it judges that the test packets passed through that router.

Step S32: The packets having the IP addresses dedicated to the test packets in the second embodiment (see top row of FIG. 13) are transmitted toward each router 3.

Step S33: The MIB information for the packets prescribed in FIG. 13 is received from each router 3. The subsequent steps are the same as the case of the first embodiment (S26 to S30).

Summarizing the above, the multicast tree monitoring system 10 according to the second embodiment uses a multicast frame transmission device (2T) which transmits monitor test packets with a specific source IP address or specific destination multicast IP addresses, a multicast tree monitor server (4) which collects MIB information specifying the input interfaces (ports) of the test packets (addressMapSource and addressMapNetworkAddress) and MIB information measuring the inflow of the test packets (n1MatrixSDoctets), and routers 3 generating MIB information based on the inflow of the test packets and is configured so that the monitor server (4) judges the routers 3 at which packets having the transmission address and transmission amounts instructed to the transmission device (2T) are observed by n1MatrixSDOctets and judges the transmission directions of the multicast tree at the connection links shown in the topology management table 34 from the results of collection of the addressMapSource and the addressmapNetworkAddress.

Figure 21:
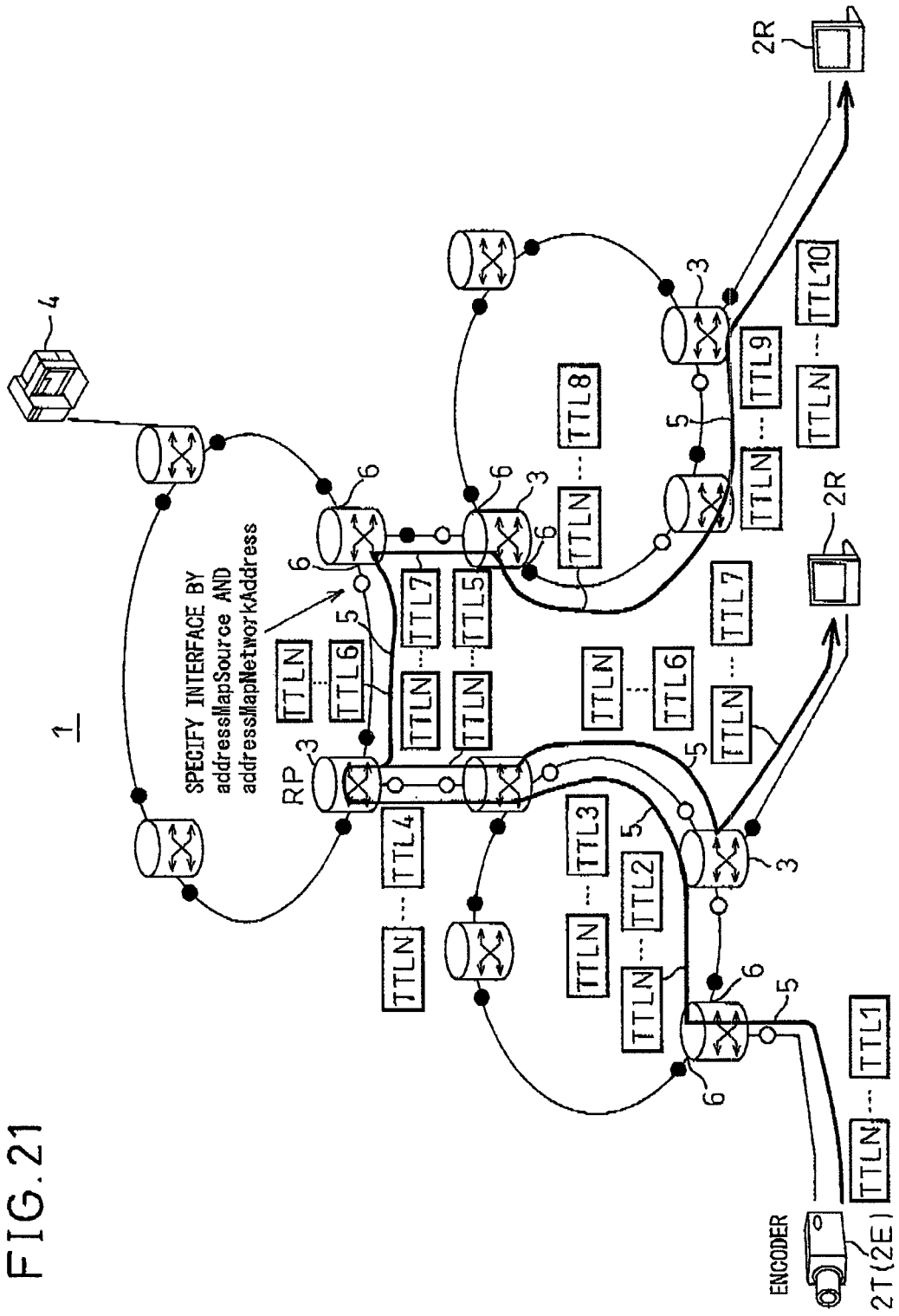
FIG. 21 is a view showing an IP network to which a third embodiment (#1) of the present invention is applied (FIG. 3).
Figure 22:
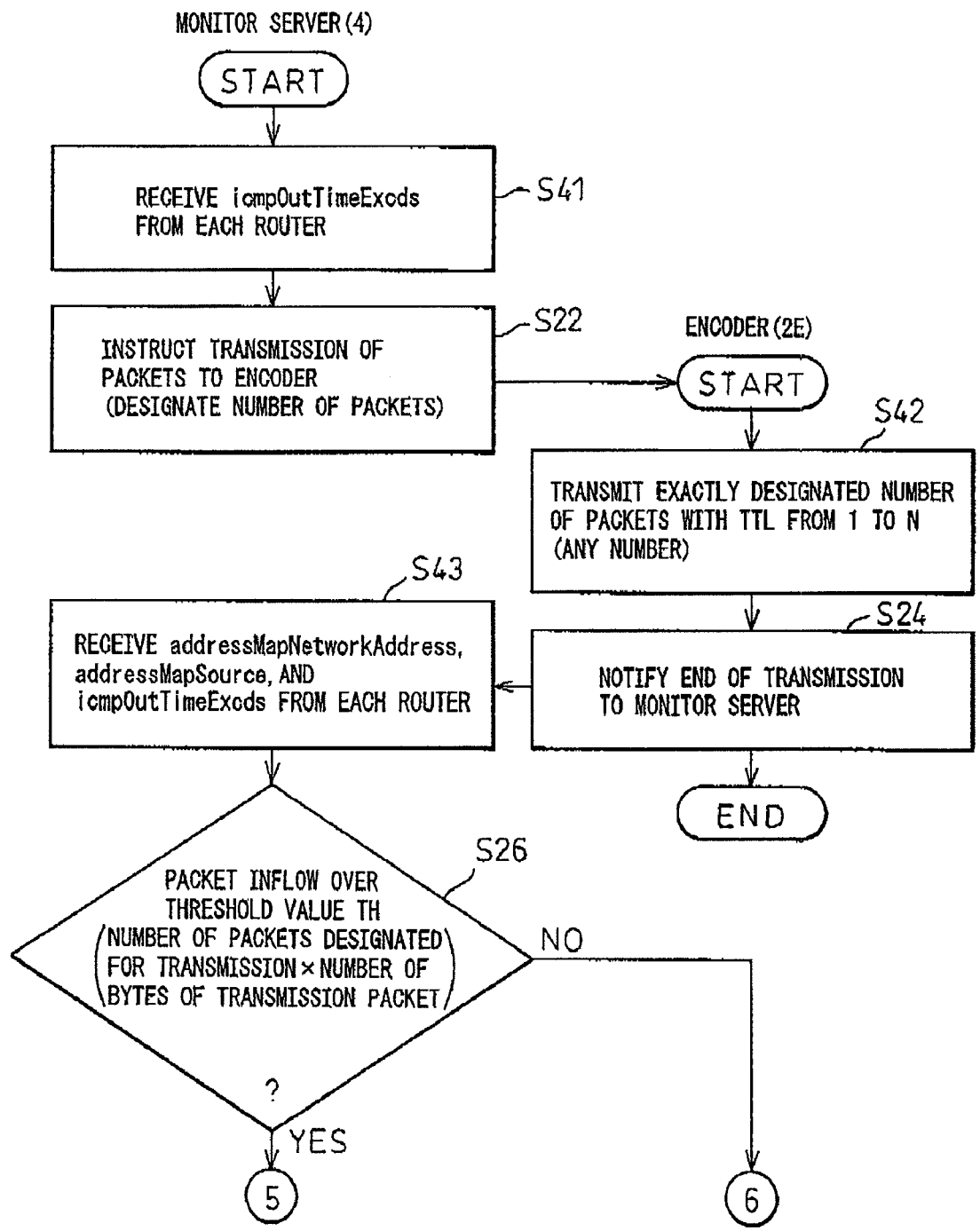
FIG. 22 is a flowchart (part 1) showing the operation of the third embodiment (#1) executed in FIG. 21.
Figure 23:
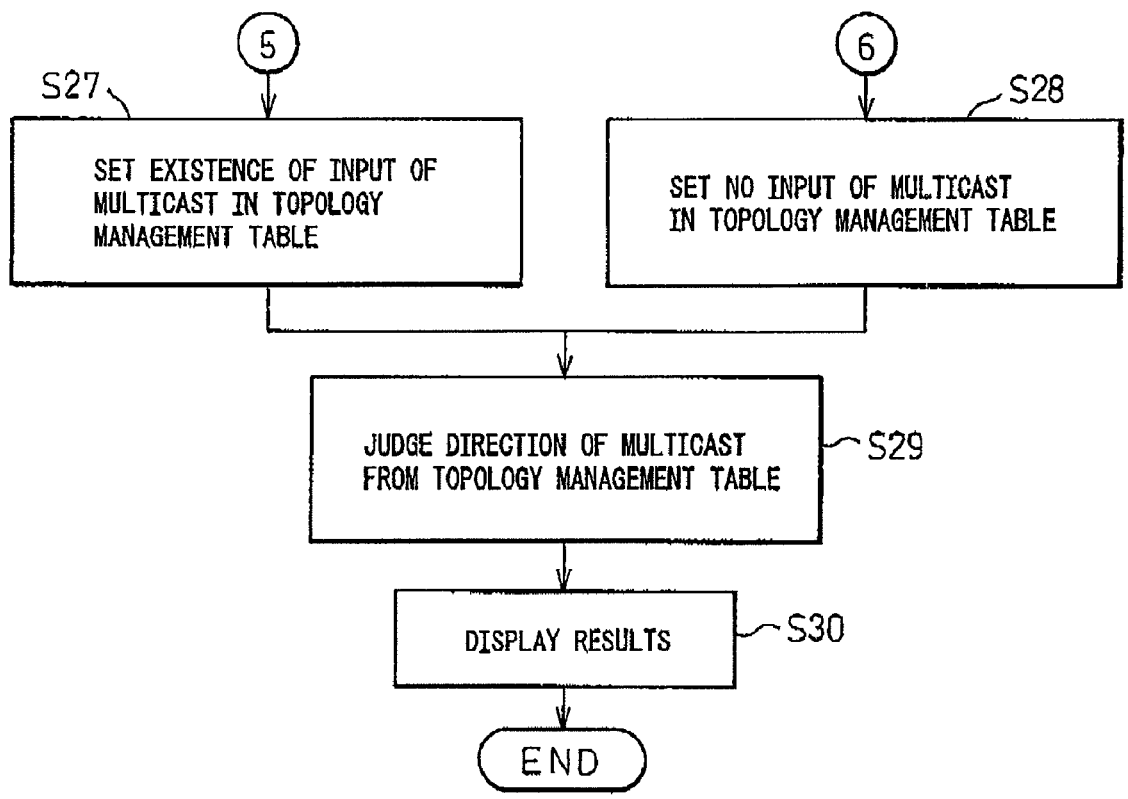
FIG. 23 is a flowchart (part 2) showing the operation of the third embodiment (#1) executed in FIG. 21.

FIG. 21 is a view showing an IP network (FIG. 3) to which the third embodiment (#1) of the present invention is applied, FIG. 22 is a flowchart (part 1) showing the operation of the third embodiment (#1) executed in FIG. 21, and FIG. 23 is the same flowchart (part 2).

First, referring to FIG. 21, the operation under the third embodiment (#1) becomes as in the following 1 to 8:

1. Examine unused addresses in subnet of encoder (2E),

2. Collect MIB (icmpTimeExcds) before test packet transmission from each router 3, 3. Designate transmission address of test packets and instruct transmission to encoder (2E), 4. Transmit certain amount of test packets by designated addresses and TTLs from 1 to N, 5. Collect MIB information (addressMapSource and addressMapNetworkAddress) from each router 3 and specify input ports of the test addresses, 6. Again collect ICMPtime excds. packets, 7. Judge interfaces with large inflow and the inflow directions of same, and 8. Display multicast tree on display unit 35.

The more detailed flow of the processing will be explained referring to FIG. 22 and FIG. 23. Note that among the steps of the flowchart shown in FIG. 22 and FIG. 23, steps substantially the same as the steps of FIG. 16 and FIG. 17 are shown by the same step numbers as the corresponding steps in FIG. 16 and FIG. 17, that is, S22, S24, and S26 to S30.

Consequently, the steps which form the characterizing features of the third embodiment (#1) are S41, S42, and S43.

Step S41: The monitor server (4) receives the count value of the test packets to be sent over the IP network 1 from now (in the third embodiment (#1), the packets shown in FIG. 14) from the MIB (51 of FIG. 4) of each router 3. This is to obtain the initial count value in the MIB (51) of the packets of FIG. 14 immediately before the monitoring test. That is, when the inflow of the test packets right before the test is much greater than the initial count value, it judges that the test packets passed through that router.

Step S42: Exactly the designated number of packets designated from TTL1 to TTLN are transmitted toward each router 3.

Step S43: The MIB information for the packets prescribed in FIG. 14 is received directly from each router 3 by the monitor server (4). The subsequent steps are the same as the case of the first embodiment (S26 to S30).

Summarizing the above, the multicast tree monitoring system 10 according to the third embodiment (#1) uses a multicast frame transmission device (21) which transmits test packets having a specific source IP address or specific destination multicast IP addresses and TTL=1 to N (N: any number) in designated transmission amounts, a multicast tree monitor server (4) which collects MIB information specifying the input interfaces (ports) of the test packets (addressMapSource and addressMapNetworkAddress) and the MIB information showing that the TTL of the test packets has become 0 and the packets are discarded (icmpOutTimeExcds), and routers 3 which generate MIB information based on the transmission of the icmpOutTimeExcds packets and is configured so that the monitor server (4) extracts the routers 3 transmitting the icmpOutTimeExcds packets for exactly the number of packets instructed to the transmission device (2T) and judges the transmission directions of the multicast tree at the connection links of the topology management table 34 based on the results of collection of the addressMapSource and addressMapNetworkAddress.

Figure 24:
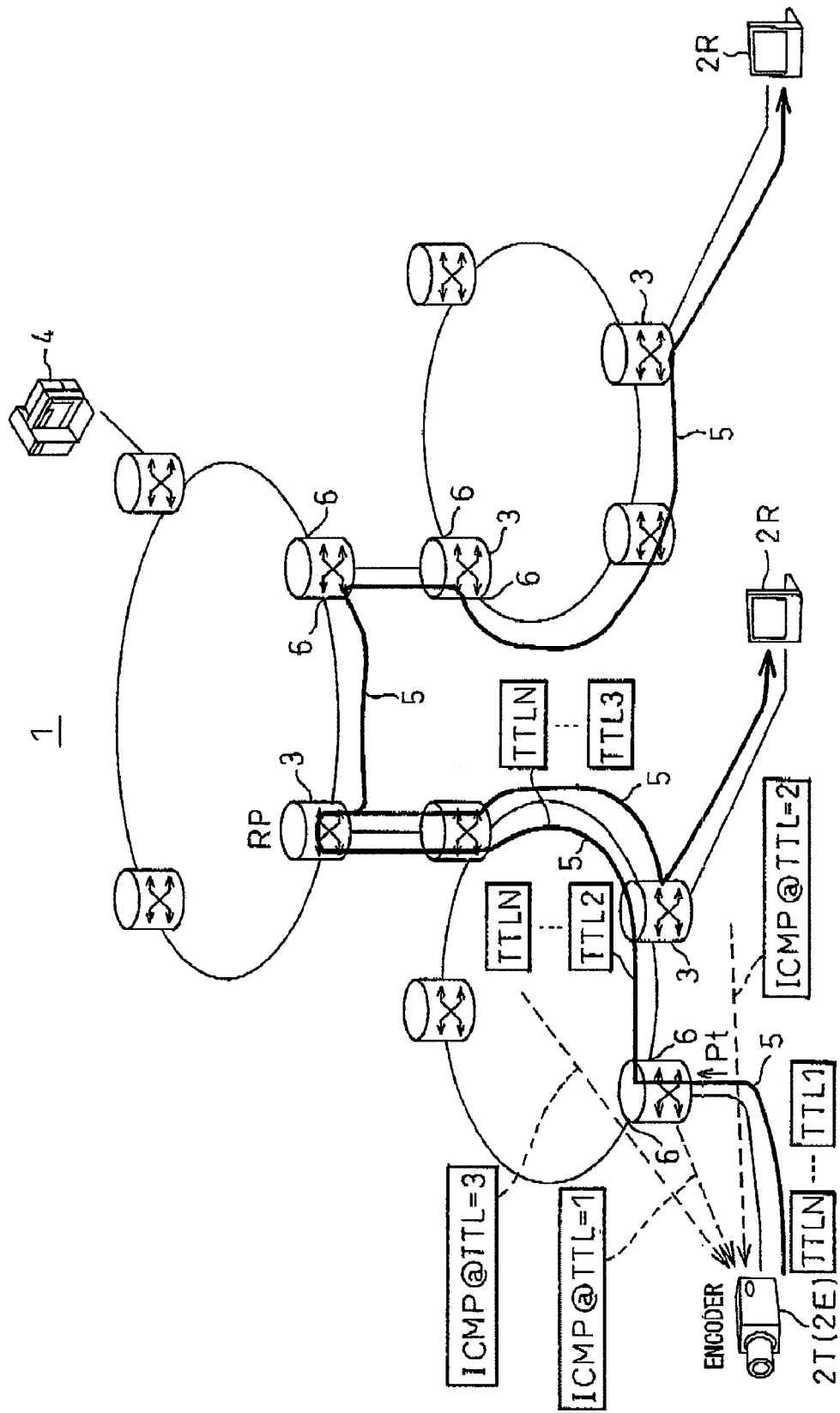
FIG. 24 is a view showing an IP network to which the third embodiment (#2) of the present invention is applied (FIG. 3).
Figure 25:
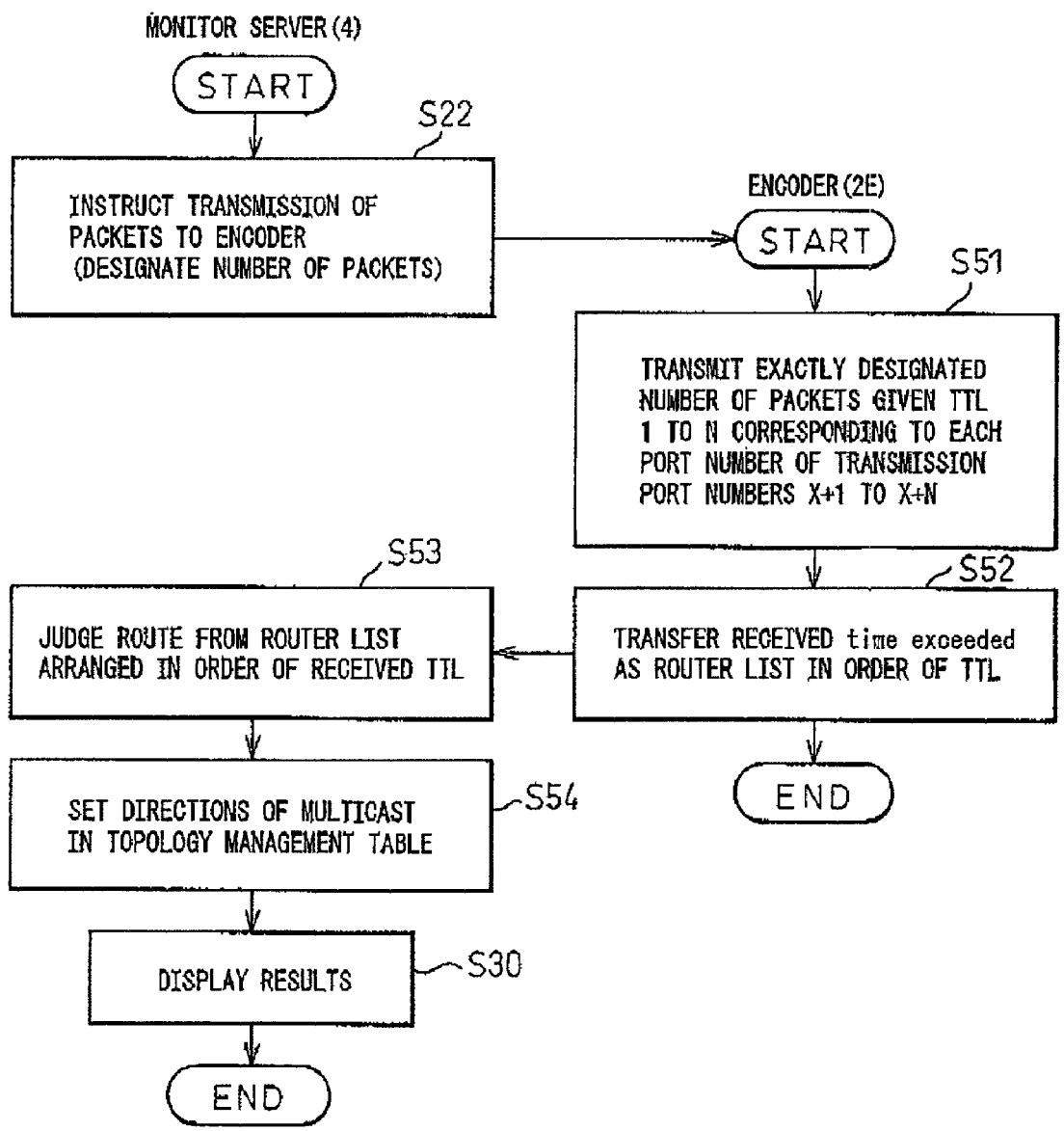
FIG. 25 is a flowchart (part 1) showing the operation of the third embodiment (#2) executed in FIG. 24.

FIG. 24 is a view showing an IP network to which the third embodiment (#2) of the present invention is applied, and FIG. 25 is a flowchart showing the operation of the third embodiment (#2) executed in FIG. 24.

Referring to FIG. 24, the operation under the third embodiment (#2) becomes as in the following 1 to 5:

1. Designate transmission port numbers of test packets and instruct transmission of test packets to encoder (2E), 2. Follow transmission instruction and transmit certain amount of test packets given TTL1 to N corresponding to port numbers of transmission port numbers X+1 to X+N to encoder (2E), 3. Notify monitor server (4) of routers returning ICMP time exceeded packets in response to packets of TTL1 to N, 4. Judge number of hops from transmission device (2T) to transmission routers (routers returning time exceeded packets) based on port numbers and addresses of transmission routers and judge transmission interfaces (ports) and transmission directions, and 5. Display tree at display unit 35.

The more detailed flow of the processing will be explained referring to FIG. 25. In the flowchart of the figure, steps 22 and S30 are as explained above, while steps 51 to 54 form the characterizing features of the third embodiment (#2).

Step S51: Corresponds to the aforementioned step 2 as explained in FIG. 24

Steps S52 and S53: Correspond to the aforementioned steps 3 and 4 as explained in FIG. 24. At step S52, the encoder (2E) prepares a router list arranging the time exceeded packets received by the encoder (2E) from the routers 3 in the order of TTL1 to N based on the transmission port numbers given in the time exceeded packets and transfers this to the monitor server (4), Furthermore, at step S53, the router list of the packets arranged in the order of the TTL1 to N received by the encoder (2E) is analyzed by the judgment unit 33 in the monitor server (4) (FIG. 4) and the transfer routes (pass status information) of the test packets are judged.

Step 54: Based on the transfer routes of the test packets, the directions of the multicast are set in the topology management table 34.

Summarizing the above, the multicast tree monitoring system 10 according to the third embodiment (#2) uses a multicast frame transmission device (2T) which transmits test packets specified by TTL=1 to N (N: any number) and the source port number or destination port numbers corresponding to the values of the TTLs (X+1 to X+N, X: any number, N: value of TTL) by designated transmission amounts and returns ICMP time exceeded packets returned from the routers 3 as transmission results to the monitor server (4), a multicast tree monitor server (4) which collects the returned ICMP time exceeded packets from the transmission device (2T), and routers 3 which transmit the information of the ICMP time exceeded packets to the monitor server (4) and is configured so as to analyze the ICMP time exceeded packets returned from the multicast frame transmission device (2T), judge the number of hops from the multicast frame transmission device (2T) to the routers 3 from the IP addresses of the routers 3 transmitting the ICMP time exceeded packets and the transmission port numbers or destination port numbers, and judge the transmission directions of the multicast frames from the neighboring routers shown in the topology management table 34 and the number of hops.

Furthermore, as a fourth embodiment of the present invention, a fault detection system in the IP network 1 is provided. That is, the multicast tree monitoring system 10 of the present invention can also function as a fault detection system. This was already explained as the fault detection judgment unit 36 of FIG. 4, but here the overall fault detection system will be shown.

Figure 26:
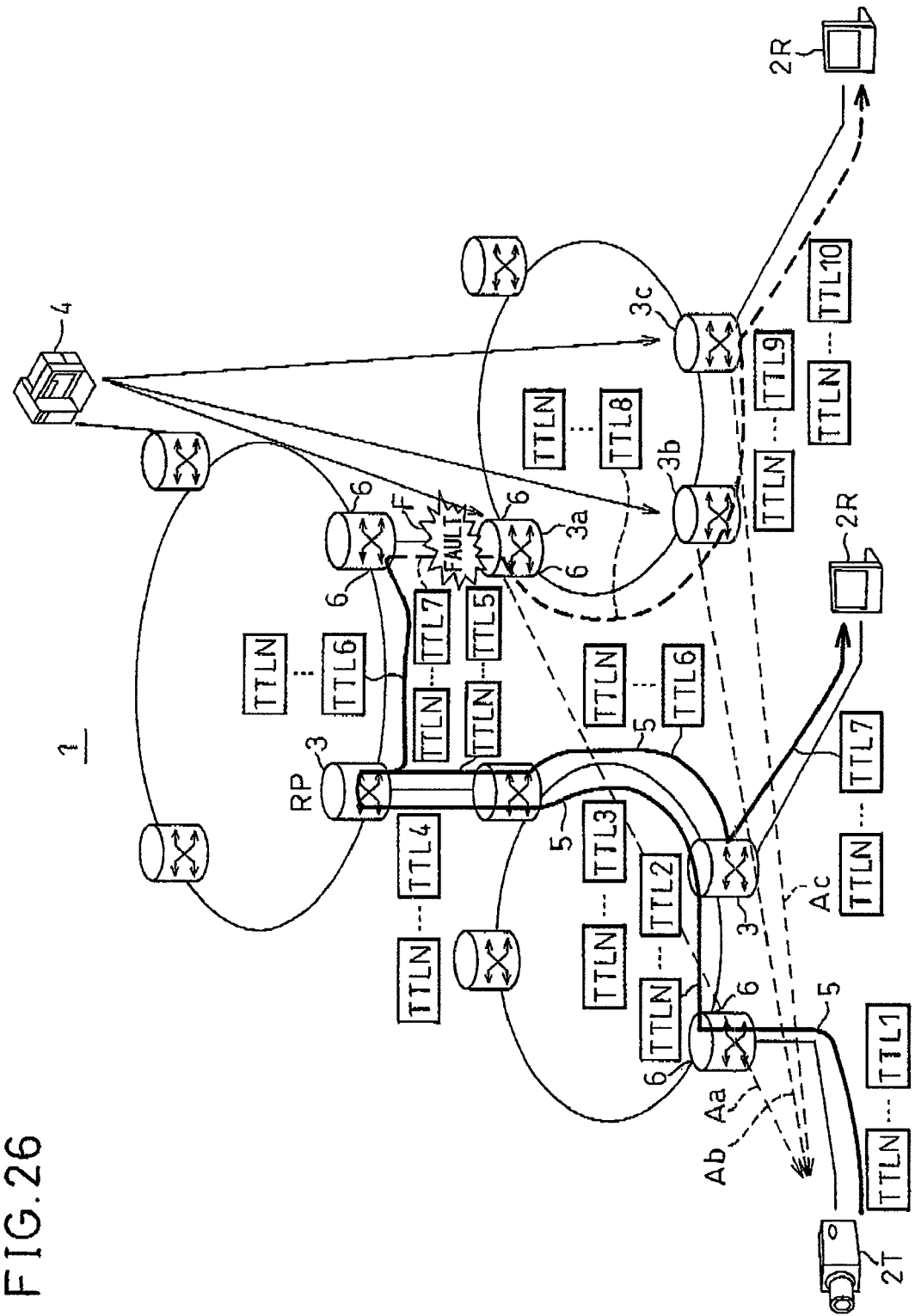
FIG. 26 is a view showing an IP network to which a fault detection system is applied as a fourth embodiment.
Figure 28:
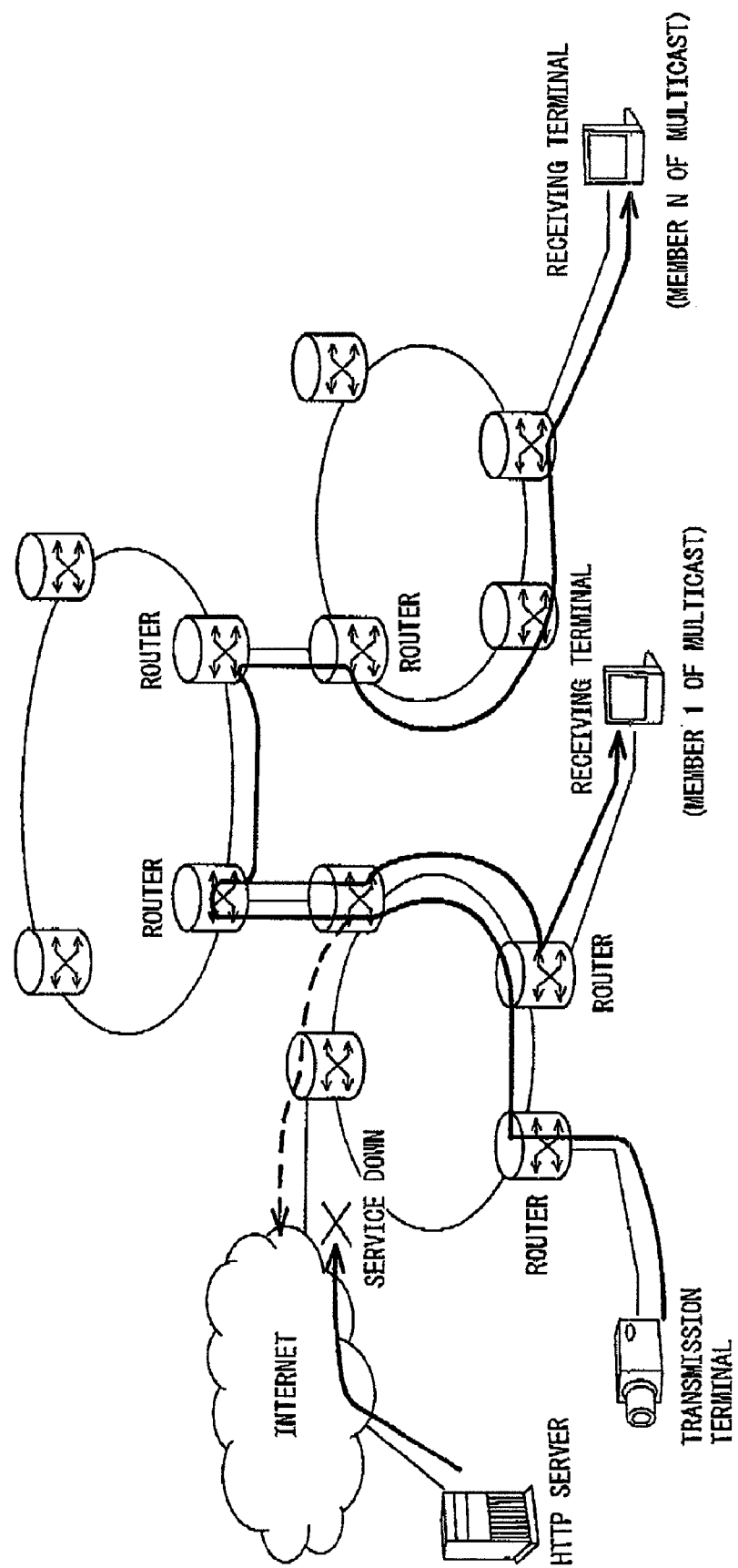
FIG. 28 is a view showing a case study of a fault in an IP multicast network.
Figure 29:
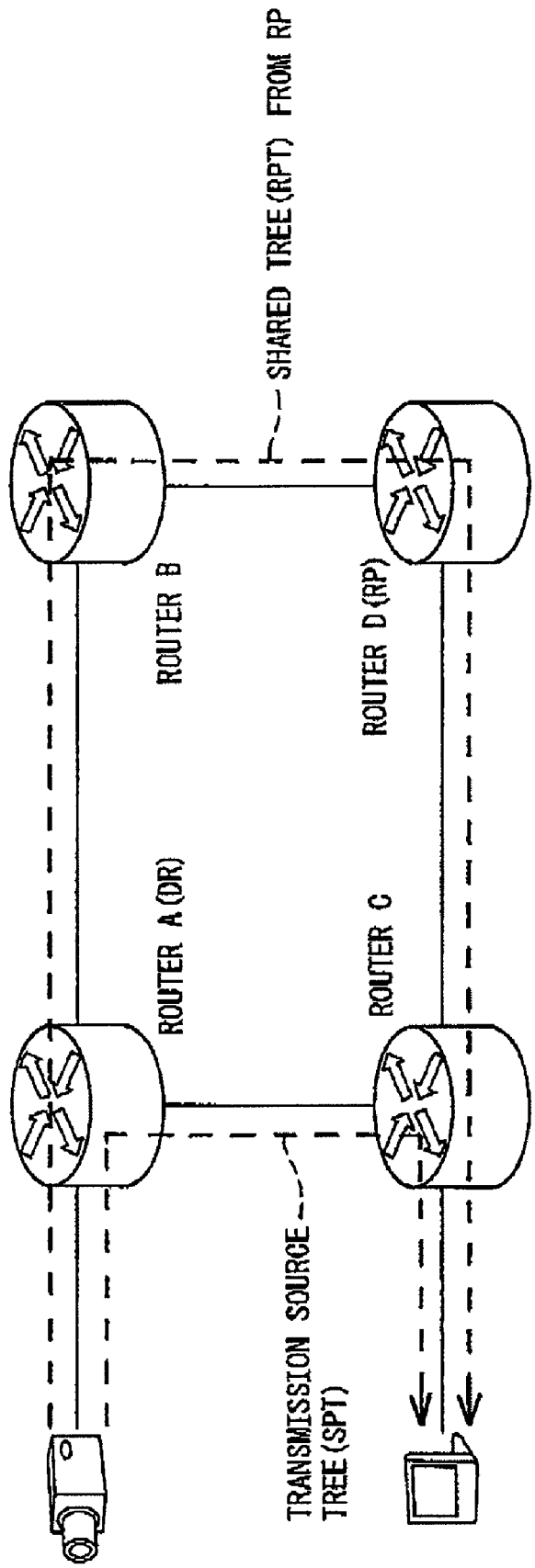
FIG. 29 is a viewing showing an example of a transmission route for explaining one problem of the prior art.

FIG. 26 is a view showing an IP network to which the fault detection system of the fourth embodiment is applied. In the figure, it is assumed for example that a break in the optical fiber or a fault of a router 3 causes a fault at an F (fault) point in the figure. If utilizing the multicast tree monitoring of the present invention, such a fault location (F) can be simply specified.

Due to this, in the example of this figure, the previously stated third embodiment is used. That is, if the transmission terminal 2T sends test packets with TTLs set from 1 to N over the network, the routers 3 return time exceeded packets to the transmission terminal 2T and the count values of the counters corresponding to the routers are increased at the monitor server (4).

However, the test packets cannot reach the routers at the downstream side of the fault location (F point) (3a, 3b, and 3c). Due to this, as shown by the dotted lines Aa, Ab, and Ac in FIG. 26, the ICMP time exceeded packets are not returned, Due to this, the count values of the counters corresponding to these routers 3a, 3b, and 3c seen from the monitor server (4) remain stopped at fixed values. As a result, the monitor server (4) deduces that the fault occurred around the router (3a) nearest the transmission terminal 2T among these routers and emits fault detection information ALM from the fault judgment unit 36.

In the above explanation, the fault was found by detecting the absence of ICMP time exceeded packets, but the invention is not limited to this. It is also possible to find the fault in the same way by monitoring for an absence of MIB information.

In this way, in carrying out the present invention, the existence of the specific test packets is important. Due to this, in the above explanation, the RTP header, TTL, transmission source port number, and the like can be used. Therefore, an example of the transmission frames forming the test packets will be shown.

FIGS. 27(a) to (d) are views showing the header format of the transmission frames. (a) of the figure shows an overall Ether frame. The IP header, UDP header, and RTP header in it are shown in detail in (b), (c), and (d) of the figure. The test packets of the first type (i) can be realized by generation of frames of the 56 bytes up to the RTP header (d) shown here. Further, the test packets of the other types (ii) and (iii) can be realized by setting the TTL (b) in the IP header or the port numbers (c) in the UDP header etc. to desired values in the header information of each layer.

As explained above, according to the present invention, a simple technique may be used for verification of the multicast tree and confirmation of communication and monitoring of the multicast tree, which used to take several hours to examine, can be completed in several minutes.

The invention claimed is:

1. A multicast tree monitoring method for searching for transmission routes of multicast frames by a network monitoring device in an IP network comprised of a transmission terminal which transmits multicast frames, a plurality of receiving terminals which receive said multicast frames, and a plurality of routers arranged on tree-shaped multicast frame transmission routes from said transmission terminal to said plurality of receiving terminals, said multicast tree monitoring method in an IP network comprising:
(a) having said network monitoring device instruct said transmission terminal to transmit monitoring test packets differentiated from said normally transmitted multicast frames,
(b) having said transmission terminal transmit said test packets toward said routers in accordance with said instruction,
(c) having each of said routers receiving said transmitted test packets and passing them through generate pass status information of said test packets, and (d) having said network monitoring device judge transmission directions of said test packets on said IP network based on said pass status information collected from said routers and specify said tree-shaped transmission routes by the result of this judgment, wherein said monitoring test packets are selected from any one of (i) packets having a data length that is usually not adopted as said multicast frames, (ii) packets which have an unused source IP address or unused destination multicast IP address, and (iii) packets set with an effective time period TTL (Time To Live) of the packets of from 1 up to a predesignated N, and wherein a predetermined certain number of said test packets are continuously transmitted.

2. A multicast tree monitoring method according to claim 1, wherein said pass status information at said step (c) is generated as network management database MIB (Management Information Base) information.

3. A multicast tree monitoring method according to claim 1, wherein said judgment at said fourth step is performed with reference to a topology management table, in said network monitoring device, holding the connections with neighboring routers.

4. A multicast tree monitoring system for searching for transmission routes of multicast frames by a network monitoring device in an IP network comprised of a transmission terminal which transmits multicast frames, a plurality of receiving terminals which receive said multicast frames, and a plurality of routers arranged on tree-shaped multicast frame transmission routes from said transmission terminal to said plurality of receiving terminals, said multicast tree monitoring system comprised of an instruction functional part, provided in said network monitoring device, for instructing said transmission terminal to transmit monitoring test packets differentiated from said normally transmitted multicast frames, a transmission functional part, provided in said transmission terminal, for transmitting said test packets toward said routers in accordance with said instruction, a status information generation functional part, provided at each of said routers receiving said transmitted test packets and passing them through, for generating pass status information of said test packets, and a judgment functional part, further provided in said network monitoring device, for judging transmission directions of said test packets on said IP network based on said pass status information collected from said routers and specifying said tree-shaped transmission routes by the result of this judgment, wherein said monitoring test packets are selected from any one of (i) packets having a data length that is usually not adopted as said multicast frames, (ii) packets which have an unused source IP address or unused destination multicast IP address, and (iii) packets set with an effective time period TTL (Time To Live) of the packets of from 1 up to a predesignated N, and wherein a predetermined certain number of said test packets are continuously transmitted.

5. A network monitoring device, in a multicast tree monitoring system, for searching for transmission routes of multicast frames by the network monitoring device in an IP network comprised of a transmission terminal which transmits multicast frames, a plurality of receiving terminals which receive said multicast frames, and a plurality of routers arranged on tree-shaped multicast frame transmission routes from said transmission terminal to said plurality of receiving terminals, said network monitoring device comprising:

an instruction functional part for instructing said transmission terminal to transmit monitoring test packets differentiated from said normally transmitted multicast frames and a judgment functional part for judging transmission directions of said test packets on said IP network based on pass status information of said test packets generated at each of said routers receiving said transmitted test packets and passing them through and for specifying said tree-shaped multicast frame transmission routes by the results of the judgment, wherein said monitoring test packets are selected from any one of (i) packets having a data length that is usually not adopted as said multicast frames, (ii) packets which have an unused source IP address or unused destination multicast IP address, and (iii) packets set with an effective time period TTL (Time To Live) of the packets of from 1 up to a predesignated N, and wherein a predetermined certain number of said test packets are continuously transmitted.

6. A network monitoring device according to claim 5 wherein said judgment functional part has a status information collection part for collecting said pass status information from said routers, a status information storage unit for storing said collected pass status information, and a multicast path judgment unit for judging said directions of transmission based on said stored pass status information.

7. A network monitoring device according to claim 6, wherein said judgment functional part performs said judgment when a difference between said pass status information, stored in said status information storage unit, immediately before transmission of said test packets and the pass status information after transmission of the test packets is large.

8. A network monitoring device according to claim 5, wherein said judgment functional part has a topology management table, referred to for judgment of said direction of transmission, holding the connections with neighboring routers, in said network monitoring device.

9. A network monitoring device according to claim 5, wherein said judgment functional part has a tree display part which displays the configuration of said tree-shaped multicast frame transmission routes specified by the results of said judgment.

10. A network monitoring device according to claim 5, wherein said judgment functional part further has a fault judging part for generating fault detection information when judging that said tree-shaped multicast frame transmission routes specified by the results of judgment do not reach all receiving terminals which should receive said multicast frames.

11. A transmission terminal, in a multicast tree monitoring system for searching for transmission routes of multicast frames by a network monitoring device in an IP network comprised of a transmission terminal which transmits multicast frames, a plurality of receiving terminals which receive said multicast frames, and a plurality of routers arranged on tree-shaped multicast frame transmission routes from said transmission terminal to said plurality of receiving terminals, said transmission terminal comprising a transmission functional part for receiving an instruction from said network monitoring device to transmit monitoring test packets differentiated from normally transmitted multicast frames and transmitting said test packets toward said routers, wherein said monitoring test packets are selected from any one of (i) packets having a data length that is usually not adopted as said multicast frames, (ii) packets which have an unused source IP address or unused destination multicast IP address, and (iii) packets set with an effective time period TTL (Time To Live) of the packets of from 1 up to a predesignated N, and wherein a predetermined certain number of said test packets are continuously transmitted.

12. A transmission terminal according to claim 11, wherein said transmission functional part has a tree monitoring request receiving part for receiving an instruction from said network monitoring device to transmit said monitoring test packets and a test packet transmitting part for receiving said instruction and generating and transmitting said test packets.

13. A transmission terminal according to claim 12 wherein said test packets which are generated and transmitted by said test packet transmitting part are selected from any one of (i) packets having a data length that is usually not adopted as said multicast frames,(ii) packets which have an unused source IP address or destination address multicast IP address, and (iii) packets set with an effective time period TTL (Time To Live) of the packets of from 1 up to a predesignated N and wherein a predetermined certain number of said test packets are continuously transmitted.

* * * * *